(12) United States Patent
Fang et al.

(10) Patent No.: US 7,359,124 B1
(45) Date of Patent: Apr. 15, 2008

(54) WIDE-ANGLE VARIABLE FOCAL LENGTH LENS SYSTEM

(75) Inventors: Ji Fang, Ruston, LA (US); Jackie Chen, Ruston, LA (US); Weisong Wang, College Station, TX (US); Kody Varahramyan, Ruston, LA (US); R. Alfred Gunasekaran, Ruston, LA (US); Mangilal Agarwal, Ruston, LA (US)

(73) Assignee: Louisiana Tech University Research Foundation as a division of the Louisiana Tech University Foundation, Ruston, LA (US)

( * ) Notice: Subject to any disclaimer, the term of this patent is extended or adjusted under 35 U.S.C. 154(b) by 0 days.

(21) Appl. No.: 11/119,517

(22) Filed: Apr. 30, 2005

Related U.S. Application Data

(60) Provisional application No. 60/567,274, filed on Apr. 30, 2004.

(51) Int. Cl.
  *G02B 1/06* (2006.01)
  *G02B 3/12* (2006.01)
(52) U.S. Cl. .................. 359/666; 359/665; 359/676; 359/811
(58) Field of Classification Search ............... 359/665, 359/666
  See application file for complete search history.

(56) References Cited

U.S. PATENT DOCUMENTS

| 3,598,479 A | 8/1971 | Wright | |
|---|---|---|---|
| 4,289,379 A * | 9/1981 | Michelet | 359/666 |
| 4,444,471 A | 4/1984 | Ford | |
| 4,514,048 A | 4/1985 | Rogers | |
| 4,783,153 A * | 11/1988 | Kushibiki et al. | 359/665 |
| 4,834,512 A * | 5/1989 | Austin | 345/6 |
| 5,574,598 A * | 11/1996 | Koumura et al. | 359/666 |
| 5,684,637 A | 11/1997 | Floyd | |
| 6,233,098 B1 * | 5/2001 | Plesko | 359/666 |
| 7,079,203 B1 | 7/2006 | Huang et al. | |
| 7,142,369 B2 | 11/2006 | Wu et al. | |
| 2004/0169816 A1 * | 9/2004 | Esch | 351/160 R |
| 2004/0190153 A1 * | 9/2004 | Esch | 359/666 |
| 2006/0164731 A1 | 7/2006 | Wu et al. | |

FOREIGN PATENT DOCUMENTS

JP   10-115809   *  5/1998
WO   WO06011937 A3   2/2006

OTHER PUBLICATIONS

J. Chen, W. Wang, J. Fang, K. Varahramyan, "Variable-Focusing Microlens with Micro Fluidic Chip", J. Micromechanics and Microengineering, Mar. 2004, 675-680, vol. 14.

(Continued)

*Primary Examiner*—Jordan M. Schwartz
(74) *Attorney, Agent, or Firm*—Jones, Walker, Waechter, Poitevent, Carrere & Denegre, L.L.P.

(57) ABSTRACT

A variable focal length microlens system having a base section with a fluid chamber and a fluid pressurization mechanism. A flexible, substantially transparent polymer lens section is fixed above the fluid chamber and the lens section has a curvature providing an initial focal point when in an unstrained state. The fluid chamber is substantially sealed and the fluid pressurization mechanism includes a flexible wall in the base section. The flexible wall may be displaced by magnetic activation, PZT activation of another activating mechanism.

21 Claims, 11 Drawing Sheets

OTHER PUBLICATIONS

N. Chronis, G. Liu, K. Jeong, L. Lee, "Turnable liquid-filled microlens array integrated with microfluidic network", Optics Express, Sep. 22, 2003, 2370-2378, vol. 11, No. 19.

A. Singh, "Variable Focal Length Microlens Using Electrical and Fluidic Actuation", Jan. 2004.

"And another lens changes shape", MicroNano, Apr. 2004, 15, vol. 9, No. 4.

K-H Jeong, G. L. Liu, N. Chronis, L.P.Lee, "Tunable microdoublet lens array" Optics Express, May 31, 2004, 2494-2500, vol. 12, No. 11.

R. Kornbluh, R. Pelrine, J. Joseph, R. Heydt, Q. Pei, S. Chiba, "High-field Electrostriction of elastomeric polymer dielectrics for actuation", SPIE vol. 3669, Mar. 1991, 149-161.

Y. Bar-Cohen, "Electro-active polymers: current capabilities and challenges", SPIE Smart Structures and Materials Symposium, 2002.

S. Kwon, L. Lee, "Focal Length control by Microfabricated Planar Electrodes-based Liquid Lens (uPell)". Transducers '01, 2001, 1348-1351, vol. 2.

S. Kwon, V. Milanovic, l. Lee, "Vertical Microlens Scanner for 3D Imaging", Technical Digest of the 2002 Solid-State Sensor and Actuator Workshop.

S-H Ahn, Y-K Kim, "Proposal of human eye's crystalline lens-like variable focusing lens", IEEE, 1998, 89-90.

D-Y. Zhang, V. Lien, Y. Berdichevsky, J. Choi and Y-W. Lo, "Fluidic adaptive lens with high focal length turnability", Appied Physics, 2003, 3171-3172, vol. 82, No. 19.

G.C. Knollman, J.L.S. Bellin, J.L. Weaver,"Variable-Focus Liquid-Filled HydroacousticLens", The Journal of the Acoustical Society of America, 1971, 49, 253-261, V. 41, No. 1.

Si-Hong Ahn, Yong-Kweon Kim, "Proposal of human eye's crystalline lens-like variable focusing lens", Sensor and Actuator 78, 1999, 48-53.

N. Sugiura, S. Morita, "Variable-focus liquid-filled optical lens", Applied Optics, Aug. 1, 1993, vol. 32, No. 22.

De-Ying Zhang, Nicole Justis, Yu-Hwa Lo, "Lens Type Tunability in Fluidic Adaptive Lens", Lasers and Electro-Optics Society, 2003. 523-524, V. 2.

L.G. Commander, S.E. Day, C.H. Chia and D.R. Selviah,"Microlens immersed in nematic liquid crystal with electically controllable focal length", Jun. 12, 2002, p. 1-5.

T. Krupenkin, S. Yang, P. Mach, "Tunable liquid microlens", Applied Physics Letters, 2003, 316-318, vol. 82, No. 3.

D.Y. Zhang, N. Justis, Y.H. Lo, "Fluidic adaptive lens of transformable lens type", Applied Physics Letters, 2004, 4194-4196, vol. 84, No. 21.

D.Y. Zhang, N. Justis, Y.H. Lo, "Integrated fluidic adaptive zoom lens," Optics Letters, 2004, 2855-2857, vol. 29, No. 24.

S. Chang, J. Yoon, "Shape controlled, high fill-factor microlens arrays fabricated by a 3D diffuser lithography and plastic replication method", Optic Express, vol. 12, No. 25 Dec. 13, 2004, pp. 6366-6371.

S. Moon, N. Lee, S. Kang, "Fabrication of a microlens array using micro-compression molding with an electroformed mold insert", J. Micromech. Microeng., 2003, 98-103, vol. 13.

* cited by examiner

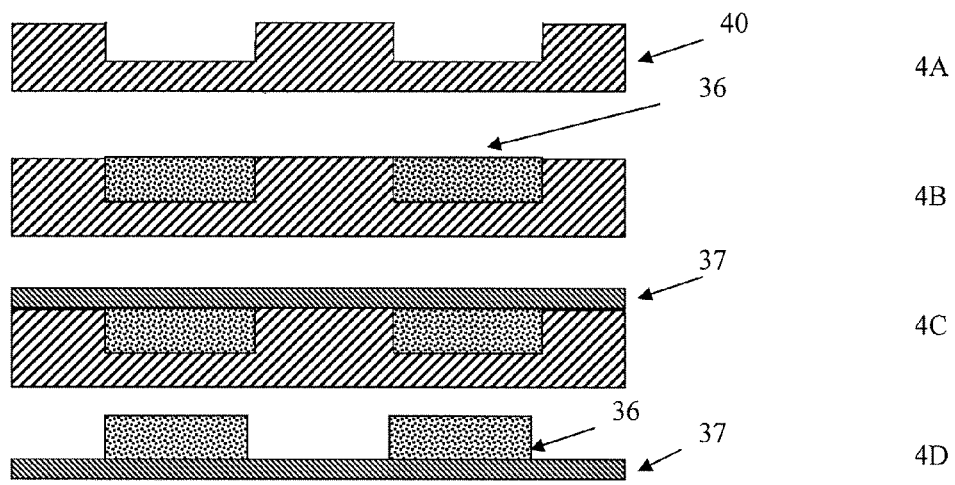
Figure 4
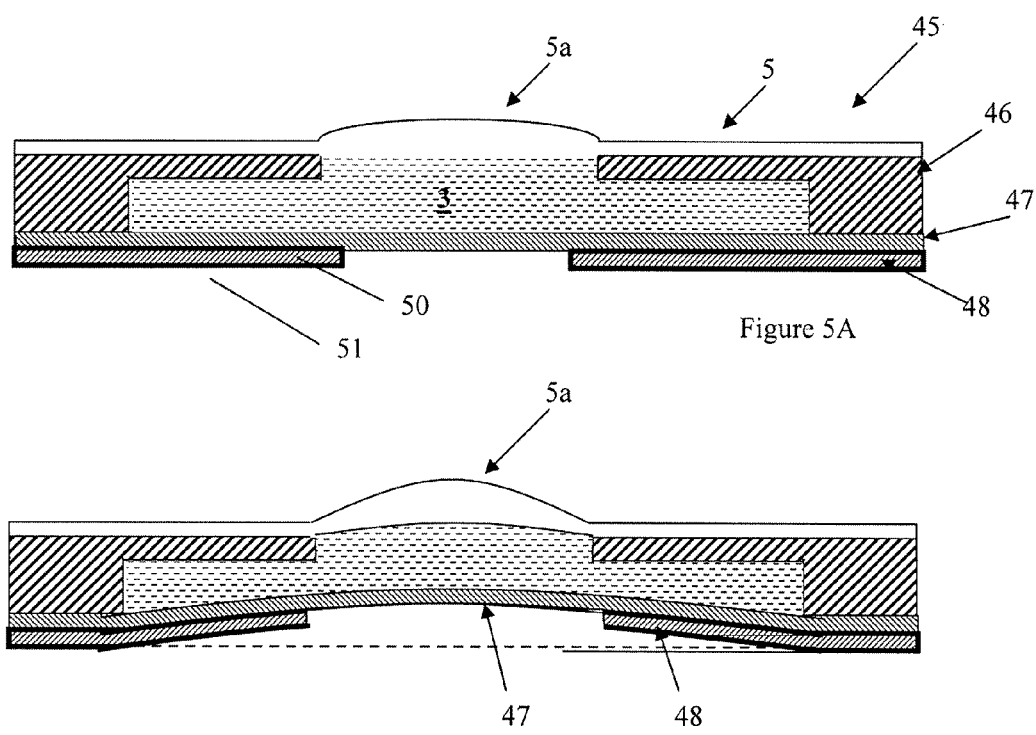
Figure 5A
Figure 5B

Legends:  ▨ Glass Section
          ▧ Photoresist
          ■ Titanium and Platinum

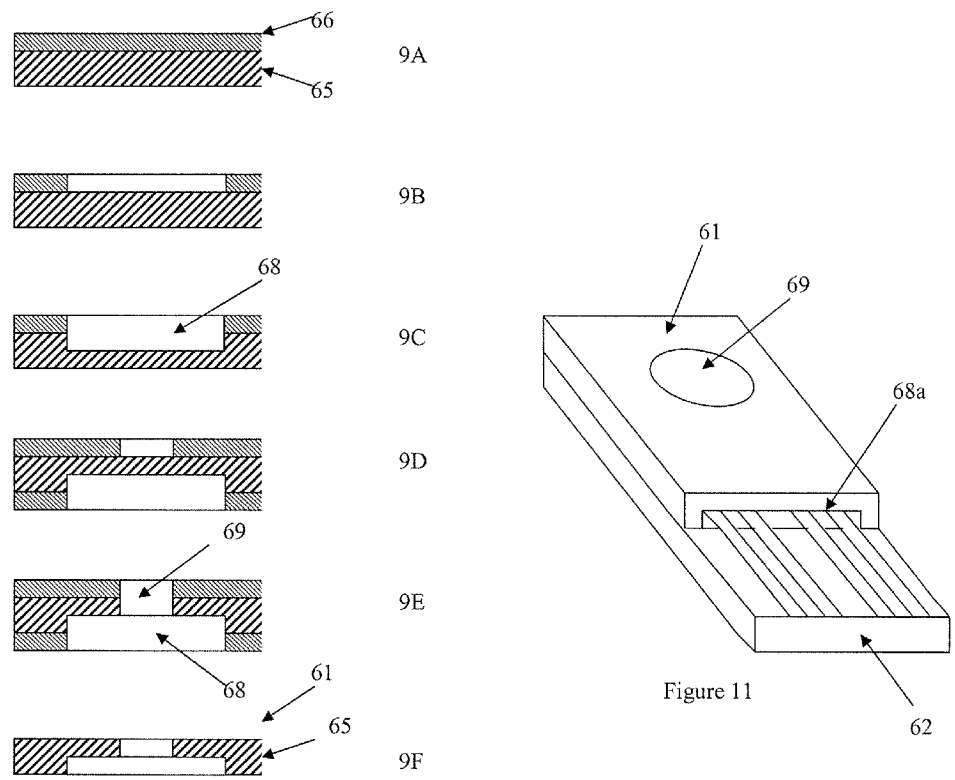
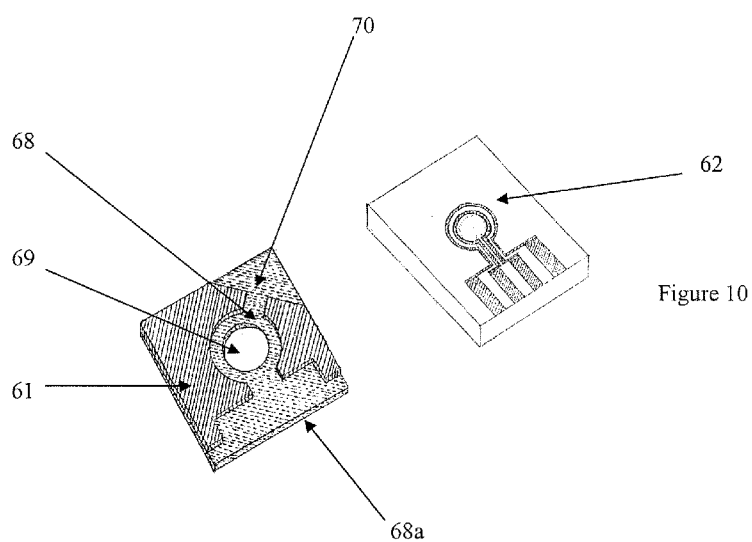
Figure 9
Figure 11
Figure 10

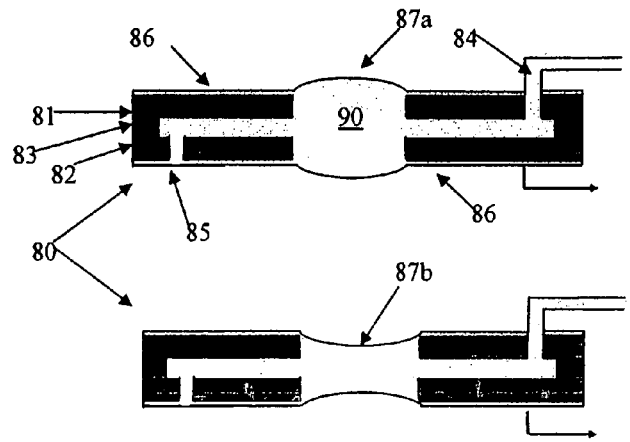
Figure 12A
Figure 12B
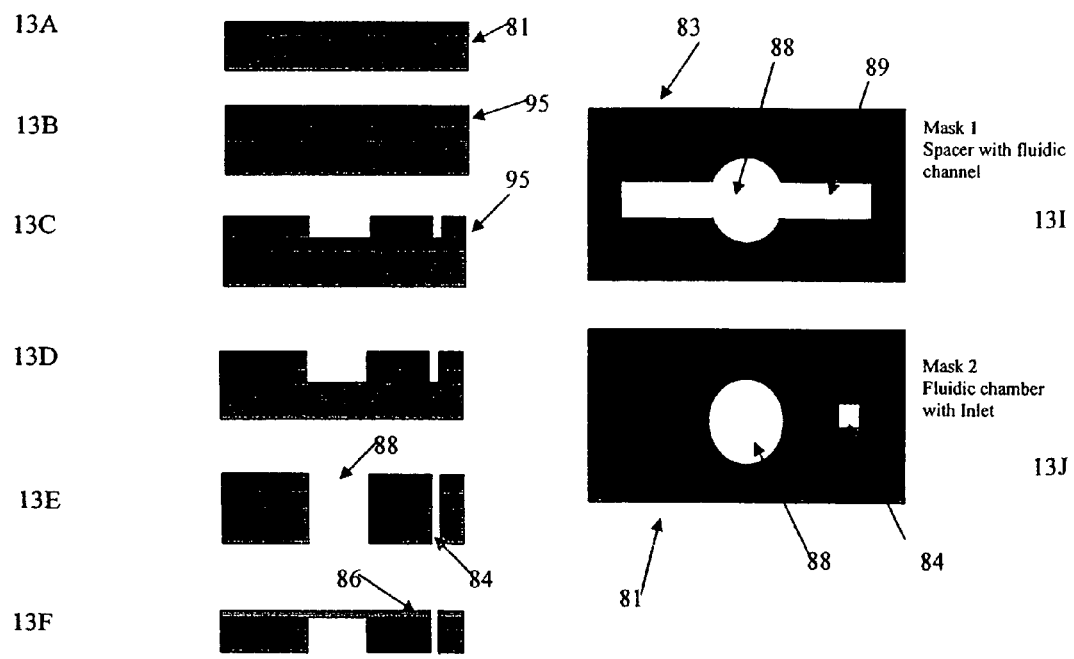
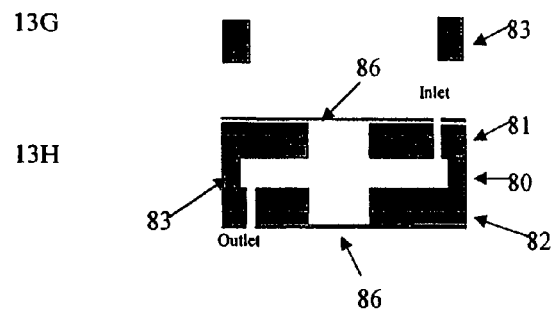
FIGURE 13

Figure 21A  Before voltage is applied

After voltage is applied

United States Patent 7,359,124 B1

WIDE-ANGLE VARIABLE FOCAL LENGTH LENS SYSTEM

This application claims the benefit under 35 USC §119(e) to U.S. Provisional Application No. 60/567,274 filed Apr. 30, 2004, which is incorporated by reference herein in its entirety.

The invention described herein was made with support of the U.S. Government, and the U.S. Government may have certain rights in the invention as provided for by the terms of Grant Nos. 32096756141 and BAA 01-42-#427 awarded by the Defense Advanced Research Projects Agency.

FIELD OF THE INVENTION

The present invention relates to flexible lens systems, in particular lens systems wherein certain optical parameters are selectively adjustable.

BACKGROUND OF THE INVENTION

Optical systems often require variable focal length to allow the field of view (FOV) or the magnification to be altered. These systems with lenses and mirrors as conventional optical elements of fixed focal length use focusing mechanisms which are complicated and consist of many moving parts such as gears, motors and sliders to image a moving object or objects with high irregular shape. These mechanical focusing mechanisms become particularly difficult to employ when dealing with microlens systems for micro-electrical mechanical systems (MEMS).

The study of variable focal length microlens has been an area of activity for many years. Variable focal length is a necessary attribute in many optical applications if the object being imaged is not in a fixed position. Several recent publications have recognized that the potential for variable microlens impact significantly the field of optical applications [1][2]. The variation of focal length can be provided by a focalizing mechanism to cause the focal plane shift. The different approaches using liquid crystal methods [3][4] and electrowetting methods [5][6] have been investigated by other researchers, but the liquid crystal lens has limited application in the microlens area and the electrowetting liquid concept lens requires a high voltage source. Both methods required electrodes, which are immersed in the electrolyte solution and cause severe optical distortion. A variable microlens system overcoming these disadvantages is needed in the art.

BRIEF DESCRIPTION OF THE DRAWINGS

FIGS. 4A to 4D illustrate process steps for incorporating a magnetic material into the microlens embodiment of FIGS. 3A to 3C.

FIGS. 5A and 5B illustrate one embodiment of a PZT actuated microlens of the present invention.

FIGS. 9A to 9F illustrate process steps for fabricating another component of the microlens embodiment seen in FIG. 6.

FIG. 10 illustrates the two basic components of the microlens embodiment seen in FIG. 6.

FIG. 11 illustrates the assembly of the components seen in FIG. 10.

FIGS. 12A and 12B illustrate an embodiment of a DCX/DCV microlens system of the present invention.

FIGS. 13A to 13J illustrate process steps for fabricating the microlens embodiment seen in FIG. 12.

FIGS. 21A and 21B illustrate a convex lens section positioned on a EAP actuator.

DETAIL DESCRIPTION OF THE INVENTION

One embodiment of the present invention comprises a microlens system or apparatus which will allow for the relatively rapid alteration of various optical parameters such as focal length, field of view (FOV), and numerical aperture. As used herein, the term "mircolens" will typically refer to a lens having a diameter of less than 5 mm, however, the present invention is not necessarily limited to such lens sizes.

Figure 1:
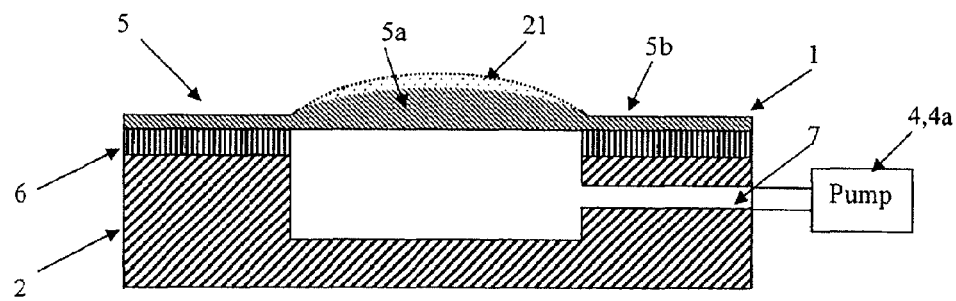
FIG. 1 illustrates one embodiment of a fluid actuated microlens of the present invention.

One embodiment of the microlens system is illustrated in FIG. 1. This embodiment of microlens system 1 will generally comprise a base section 2, a lens section 5, and an intermediate substrate 6. The base section 2 illustrated in FIG. 1 is constructed of a substantially transparent material, although the entire body of base section 2 need not be transparent, but only the area directly beneath the convex lens portion 5a such that a clear line of sight is formed through base section 2 and convex lens portion 5a. In this embodiment, base section 2 is formed of a molded and cured polydimethyl-siloxane (PDMS) such as Dow Corning Sylgard 186™ silicone. As an illustrative example only, the base section 2 could have overall dimensions of 5 mm×4.5 mm×2.5 mm (L×W×H). Base section 2 will be formed with a fluid chamber 3 which is generally round and sized to correspond with convex lens portion 5a. Additionally, a fluid channel or passage 7 will be formed in base section 2 to allow the introduction and withdrawal of fluid from fluid chamber 3.

Lens section 5 will be formed of a flexible, substantially transparent polymer material. In the embodiment of FIG. 1, lens section 5 is also a PDMS material such as Dow Corning Sylgard 186™ silicone. However, other PDMS materials or even non-PDMS polymers may be employed if sufficiently transparent and if they possess sufficient elongation properties. Lens section 5 will consist of an integrally formed convex lens portion 5a and a perimeter portion 5b. The convex lens portion 5a will be shape provide a convex lens even when the PDMS lens section is in a relaxed or unstrained state (i.e., when there is no fluid pressure on the lens as explained in more detail below). Typically for the embodiment shown in FIG. 1, the convex lens portion 5a will range from about 100 to 3000 um in diameter. As one illustrative example, convex lens portion may be approximately 1400 um in diameter at its base and have a height of approximately 85 um when in an unstrained state. In this example, the lens will have a contact angle of at least ten degrees in the unstrained state. The contact angle is the angle formed on the lens side of a tangential line drawn at the contact point of the convex portion of the lens with surrounding horizontal plane. The perimeter portion 5b will extend from convex lens portion 5a and generally provide a means for securing lens section 5 to base section 2. Because lens portion 5a has an initial curvature (whether convex or concave) in the unstrained state, lens portion 5a has some initial focal point based upon the lens curvature.

Figure 2:
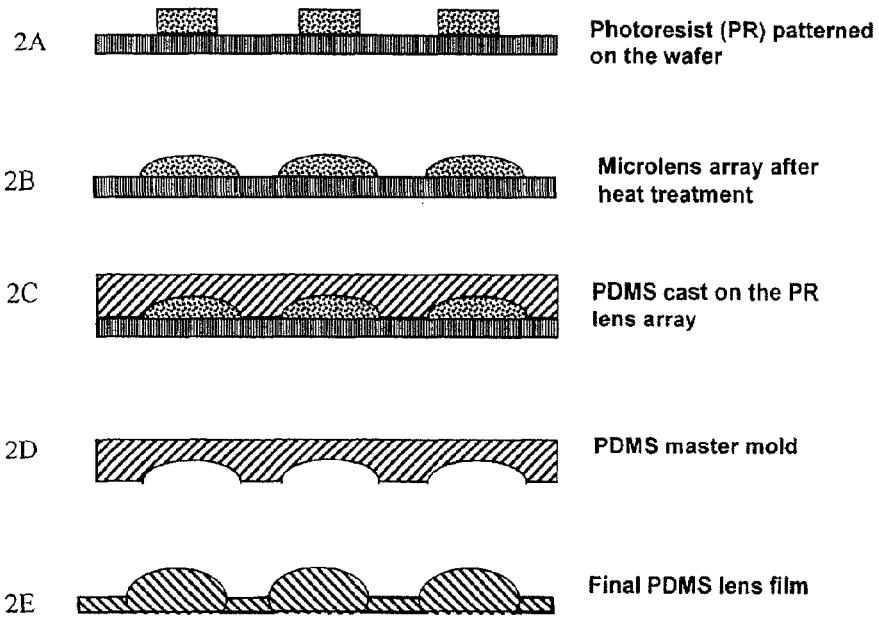
FIGS. 2A to 2F illustrate process steps for fabricating one embodiment of the PDMS microlens of the present invention.

Although the present invention encompasses any conventional process for manufacturing lens sections 5, one preferred embodiment employs a PDMS casting process, including a photo-resist reflow technique which uses liquid surface tension to form a spherical structure when the photoresist is melted. FIG. 2 illustrate the steps in this casting process. Initially, conventional photo-resist material (for example AZ 100XT sold by MicroChem Corp. of Newton, Mass.) is spin coated onto a silicon wafer and soft baked (approximately 70° C. to 110° C.) on a hot plate for 30 minutes or longer, depending on the final desired thickness of the photoresist layer. The thickness of the photoresist layer will correspond roughly with the final desired height of the individual convex lens portions 5a. Conventional UV lithography is carried out to create patterned circular photoresist mesas, and the sample is developed in AZ400K developer (see FIG. 2a).

Next, the photoresist layer is thermally reflowed (for example by heating on a hot plate) to convert the photoresist mesa structures into the deformed photoresist mounds. To help create a uniformly deformed photoresist mound, one embodiment of the invention places the sample in a chamber containing acetone vapor for approximately one minute prior to beginning the thermal reflow process. In this embodiment, the silicon wafer is placed on a hot plate at a temperature of 95° C. for approximately 10 minutes to uniformly deformed the polymeric mesas. The acetone vapor and moisture absorbed inside the polymeric mesa are removed during the heating step and final hard curing of the mesas is carried out at a temperature of approximately 120° C. to 150° C. in order to stabilized the mesa and prevent further reflow during subsequent fabrication steps. Thus, a photoresist "mother lens" is created on the wafer as suggested in FIG. 2b.

After completing the photoresist mother lens, the next step is the transfer of photoresist microstructure to a master mold. A PDMS material (e.g. Dow Corning Sylgard 186 silicone) may be used as the master mold material. As a first step, the photoresist mold is treated by exposing it to a vapor of tridecafluoro-(1,1,2,2,tetrahydrooctyl)-1-trichlorosilane (available from United Chemical Technologies of Horsham, Pa.) in order to reduce the adhesion of the cured PDMS to the photoresist. Next, the photoresist mold is placed in a shallow container (such as a petri dish) with the lens pattern facing upward. A sufficient amount of uncured PDMS mixture is poured into the dish to completely cover the photoresist mold and provide an adequate base for the mold The PDMS master mold is dried in a vacuum oven for 2 hours at 5 mtorr of pressure and 75° C. and then the mold is peeled off from the mother lens wafer. The PDMS master consists of a concave microlens array as suggested by FIG. 2d.

The final step in this particular fabrication process is spin coating a separate PDMS layer (the ultimate lens section 5) onto the PDMS master. In this embodiment, the ultimate lens material may also be Dow Corning Sylgard 186. Vapor application of a trichlorosilane compound to the PDMS master may again be used to reduce adhesion of the final PDMS film to PDMS mold. The spinning speed of the spin coating process is adjusted to obtain the desired thickness of the microlens section. In this embodiment, the thickness of the spun on PDMS layer may be between 30 and 150 um. The spun-on PDMS film is completely cured and the PDMS film forming the lens section is peeled out from the master mold. Because the PDMS master mold was completely cured prior to coating with the PDMS lens film, the PDMS lens film does not crosslink with the previously cured PDMS master mold and the lens film is readily removed from the master mold. Although the above lens section fabrication process is well adapted to producing the PDMS lens sections of the illustrated embodiments, it will be understood that many alternative fabrication processes also come within scope of the present invention.

The embodiment of FIG. 1 also illustrates an intermediate substrate 6 which serves as a bonding surface for connecting the base section 2 and lens section 5. In one example, intermediate substrate 6 may be a thin section of silicon having a through hole formed therein by any conventional process (e.g., inductively coupled plasma dry etching). The through hole will be of roughly the same diameter as the base of convex lens portion 5a (e.g., 1400 um in the above example).

To assemble the microlens system 1 seen in FIG. 1, the silicon intermediate substrate 6 is first bond to the base section 2 using any suitable adhesive (in this embodiment Devcon All Purpose Epoxy). Then the PDMS lens section 5 is bonded to intermediate substrate 6 using the same or a similar adhesive. Once the adhesive has completely cured, a fluid pressurization mechanism 4 is connected to fluid channel 7. In the embodiment shown, fluid pressurization mechanism 4 is a micro-pump 4a, one example of which is a conventional syringe pump. However, micro-pump 4a can be any type of small capacity pump which can accurately dispense volumes on the order of a few micro-liters up to a few hundred micro-liters (depending on the size the microlens system and the associated fluid chamber 3).

The operation of microlens system 1 will be readily understood with reference to FIG. 1. The transparent PDMS bottom of base section 2, the fluid chamber 3, the through hole in the intermediate aperture 6, and the lens portion 5a will form a clear line of sight or view aperture through the lens system. The fluid chamber 1 will be filled with any suitable fluid, which in one embodiment is DI water. The solid lines in FIG. 1 illustrate the lens section 5 in its unstrained state when no positive pressure exists in fluid chamber 3. In order to adjust the focal length of microlens system 1, micro-pump 4a will pump addition fluid into fluid chamber 3, thereby causing the convex portion 5a to deform outwardly as suggested by dashed line 21. The contact angle for different pumped-in water volume may be measured (for example with a Contact-Angle Measurement System provided by Future Digital Scientific Corp.) for lens optical calculations, such as curvature and back focal length. The curvature (R) can be obtained by the equation:

$$R = \left[\frac{3V}{\pi(2+\cos\theta)(1-\cos\theta)^2}\right]^{\frac{1}{3}} \quad (1)$$

where V is equal to lens' volume and θ is contact angle. The back focal length ($f_B$) of the microlens can be obtained by the following equation:

$$f_B = n_2 \frac{1 + (n_1 - 1)\cos\theta}{n_1(n_1 - 1)} R \quad (2)$$

where $n_1$, and $n_2$ are the refractive index for the PDMS microlens and pumped-in fluid, which is water, respectively ($n_1$=1.43 for Sylgard 186, and $n_2$=1.33 for water). In addition, the numerical aperture can be calculated by the following equation:

$$NA = n_2 \left\{ \frac{n_2^2[1 + (n_1 - 1)\cos\theta]^2}{n_1^2(n_1 - 1)^2 \sin^2\theta} + 1 \right\}^{-\frac{1}{2}} \quad (3)$$

From the above, it will readily be understood that the change in shape of convex portion 5a will alter the focal length of microlens system 1 and accurate metering of fluid into fluid chamber 3 will allow precise control of the focal length.

Figure 3A:
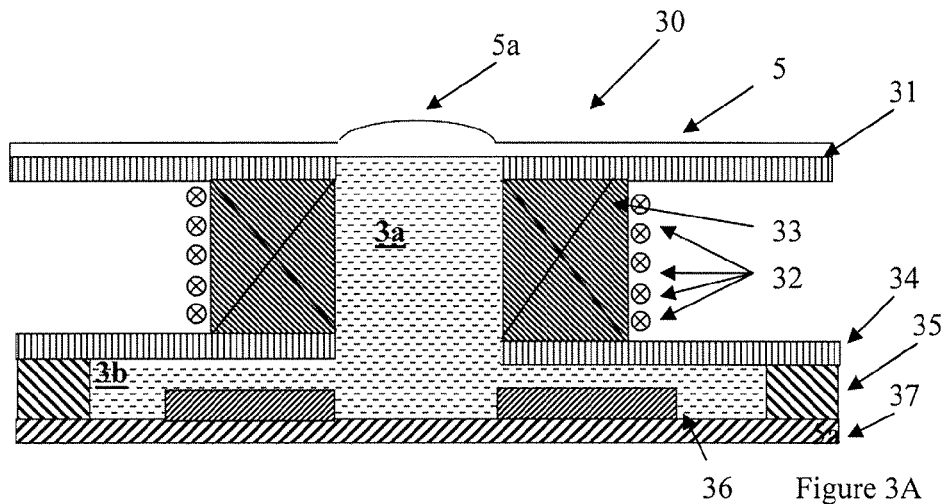
FIGS. 3A to 3C illustrate one embodiment of a magnetically actuated microlens of the present invention.
Figure 3B:
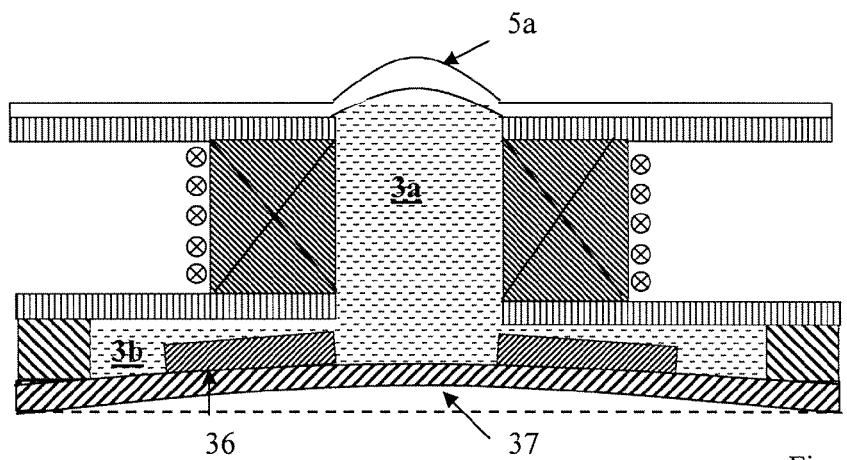

Another embodiment of the present invention is seen in FIGS. 3A and 3B. This embodiment comprises a magnetically actuated adjustable focal length micro-lens system 30. As seen in FIG. 3A, microlens system 30 generally includes a lens section 5, a lens frame 31, a magnetic core 33 with a magnetic coil 32, a core frame 34, spacer 35, and a diaphragm 37 having magnetic sections 36.

Lens section 5 may be formed as described above. Lens frame 31 may be formed of any suitable material, but in the embodiment of FIG. 3A, lens frame 31 is formed of conventional silicon wafer material and is approximately 500 to 550 um thick. Lens frame 31 will have a through-hole etched into it so as to provide a line of sight through convex lens portion 5a. Lens frame 31 will be securely attached to magnetic core 33 by any convention means such as the epoxy adhesive mentioned above. Magnetic core 33 may generally be formed of any appropriate magnetic material of various dimensions, but in the embodiment of FIG. 3A, magnetic core 33 is formed of toroid shaped mass of Ferrite with an inner diameter approximate to the base diameter of convex lens portion 5a, an outer diameter a few millimeters greater than the inner diameter and a height of perhaps 1 or 2 millimeters. The exact dimensions are not critical as long a line of sight is formed through magnetic core 33, core 33 has sufficient active area to generate the magnetic field necessary to operate the diaphragm 37 as described below, and the magnetic flux is not saturated in the core. Magnetic coil 32 will be formed of a conductive wire with the embodiment seen in FIG. 3A employing 30-35 gauge copper wire having approximately 300-700 turns (wraps) around magnetic core 33. The core frame 34 will have a through hole and will be bonded to the bottom of magnetic core 31 with conventional epoxy. In the illustrated embodiment, core frame 34 may be constructed of a silicon wafer material or lamina material such as used in printed circuit boards. A 200 um thick circuit board lamina material is employed in the illustrated embodiment. Next, a ring-like spacer 35 will be bonded with epoxy to core frame 34 and diaphragm 37 to spacer 35. Spacer 35 will be of sufficient thickness (i.e., height) to form a volume between core frame 35 and diaphragm 37 sufficient to operate the lens system as described below. In one example, spacer 35 will be approximately 250 um thick.

Diaphragm 37 may be formed of any sufficiently strong and flexible material which is substantially transparent in the area below convex lens portion 5a. It can be seen how the various elements of lens system 30 allow for an unobstructed line of sight though the center of the elements to convex lens portion 5a. In the embodiment shown, diaphragm 37 may be a formed of a PDMS layer approximately 150 um thick. Attached to the PDMS layer will be magnetic section 36 which will act to displace the diaphragm 37 when subject to a magnetic field. Magnetic section 36 may be formed of any magnetic material which may be fixed on diaphragm 37 or alternatively, formed within diaphragm 37. In one embodiment, magnetic section 36 consists of a magnetic polymer composite material formed by the addition of a ferrous powder to PDMS. As one example, PDMS and a curing agent are mixed in a ratio of 10:1 by weight and prior to curing of the PDMS, neodymium-iron-boron (NdFeB) in a fine powder form (e.g., passing a 40 um mesh filter) is combined with the PDMS in ratio of 1:3 (NdFeB to PDMS) by weight. These components are mixed thoroughly by a conventional means such as a rotary knob mixer for at least five minutes. The still uncured mixture is placed in toroid or ring-shaped mold 40, a cross-section of which is seen in FIG. 4A. A squeegee technique is used to scrape a sharp, flat edge across the mold surface in order to remove any excess mixture from the top of mold 40 and leave the magnetic PDMS/metal powder mixture 36 in the correct depressions in mold 40 as seen in FIG. 4B. The PDMS/metal powder mixture 36 is allow to sit for sufficient time (approximately 30-35 minutes) to have the PDMS in the mixture partially cure. Thereafter, the PDMS layer forming diaphragm 37 is spin coated onto the top of mold 40 as suggested in FIG. 4C. The partially cured PDMS/metal powder material and the uncured PDMS diaphragm material are placed in an oven at 80° C. for approximately 120 minutes until fully cured, thereby securely bonding the ring of PDMS/metal powder material to diaphragm 37. After full curing, diaphragm 37 is peeled from mold 40 to provide a diaphragm 37 with a ring-shaped magnetic section 36 formed thereon as seen in FIG. 4D. Since the magnetic section 36 with NdFeB is the hard magnetic material, it is magnetized under an external magnetic field before diaphragm 37 is bonded to spacer 35.

Figure 3C:
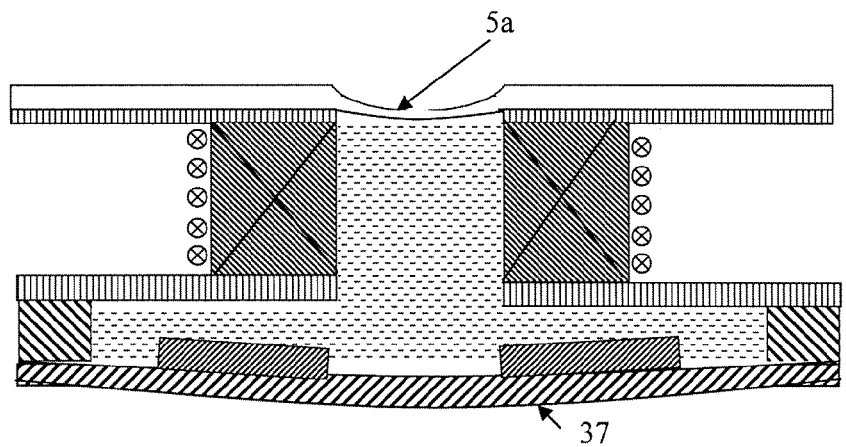

Viewing FIG. 3B, the operation of magnetically activated lens system 60 can be readily understood. When it is desired to change the focal length of convex lens portion 5a, a selected current is applied to magnetic coils 32 which in conjunction with core 33 generates a magnetic field which urges magnetic section 36 (and diaphragm 37) toward core 33. The flexing of diaphragm 37 forces fluid in lower fluid chamber 3b into upper fluid chamber 3a, thereby causing convex lens portion 5a to flex outwardly and change its focal length. In the embodiment shown, the voltage applied across the magnetic coils 32 could be on the order of approximately 0-15 V and depending of the resistance of the coils 32, will induce a current on the order of approximately 40 to 80 mA. It will be apparent that by carefully controlling the current in magnetic coils 32 for a given number of turns, the strength of the magnetic field, the degree of flexing of diaphragm 37, and therefore, the shape of convex lens portion 5a may be accurately controlled. It will also be understood that by forming lower fluid chamber 3b with a substantially greater volume than upper chamber 3a, the effect of a relatively small change in deflection of diaphragm 37 is significantly amplified to cause a comparatively large deflection of convex lens portion 5a. Although FIGS. 1-3 illustrate a convex lens, the present invention could also include a concave lens system having an unstrained curvature and an initial focal point. In the concave lens embodiment, the lens portion 5a will face downward as suggested in FIG. 3C. Likewise, the diaphragm 37 will flex downward as shown in FIG. 3C in order to cause a pressure drop in the fluid chamber and flex the lens portion 5a downward to control its degree of concavity.

A still further embodiment of the present invention is seen in FIGS. 5A and 5B. Piezoelectric (PZT) actuated lens system 45 will comprise a PDMS lens section 5, which may be constructed as described above, attached to a frame 46. Frame 46 may be formed from a conventional 500 um silicon wafer (or any other suitably strong and rigid material) and has a through-hole corresponding to convex lens portion 5a. Likewise, frame 46 will have a fluid chamber 3 etched therein and a PDMS diaphragm 47 bonded thereto. A toroid or ring shaped section of PZT material 48 with electrodes connected to both sides of the PZT surface will be formed on diaphragm 47 and oriented to cause diaphragm 47 to flex upward when a voltage is applied across the PZT material. In one embodiment, the PZT ring may be formed by a sol-gel process and patterned by wet etching; see for example, Y. Hishinuma and E. H. Yang, "Optimized design, fabrication and characterization of PZT unimorph microactuators for deformable mirrors", Proceedings of International Mechanical Engineering Congress and R&D Expo, 2004, which is incorporated by reference herein. Since the PZT layer is coated onto the PDMS layer, the top side of the PZT layer is under an interface condition between the PZT and PDMS layers while the bottom side of the PZT layer is free of such restraints. Therefore, the bottom portion of PZT layer is free to expand to a greater degree than the bonded top portion, thereby causing said PZT layer to flex in an upward direction upon activation. In the embodiment of FIG. 5, the PZT ring 48 will have an inner diameter opening approximate to the base of convex lens portion 5a, thereby providing a view aperture through the lens system.

In one embodiment, the diaphragm 47 with the PZT ring 48 will be constructed as follows. After the PDMS diaphragm 47 having a thickness of approximately 100 um to 200 um is bonded to frame 46 with a conventional adhesive such as epoxy, a thin top conductive layer is applied onto the PDMS layer as an electrode 50. The electrode material can be gold, platinum, or another metal applied in a fine layer (less than 1 um thick) by a conventional sputtering process. Alternatively, the electrode could be a conductive polymer such as conductive PDMS applied in an about 20 um thick layer by brush coating. Then, using a conventional chemical solution deposition method, a PZT layer about 2 um to 5 um thick is applied on the electrode 50 and allowed to cure to form the ultimate PZT ring 48. Next, another electrode 51 is coated on the exposed surface of the PZT film by one of the same methods as above. Thereafter, electrical leads may be attached to the electrodes 50 and 51 in any conventional manner. An electric field applied perpendicular to the PZT layer plane induces a contraction in the lateral direction, thereby producing a large out-of plane deflection of the PZT layer because of its unimorph geometry. FIG. 5B suggests how diaphragm 47 will flex upward when a voltage is applied across PZT ring 48, thereby pressurizing the fluid in fluid chamber 3 and causing convex lens portion 5a to change its shape and focal length. By regulating the magnitude of the voltage applied across PZT ring 48, the degree of flexing of diaphragm 47 and the focal length of convex lens portion 5a may be precisely controlled.

Figure 6:
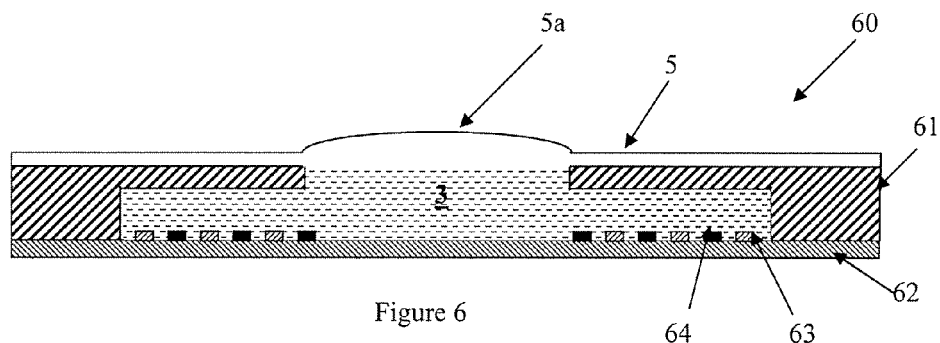
FIG. 6 illustrates one embodiment of a thermally actuated microlens of the present invention.

A still further embodiment of the present invention is seen in FIGS. 6 to 10. FIG. 6 illustrates a cross-section of a thermally activated lens system 60. Lens system 60 will generally comprise PDMS lens section 5, a frame 61, and a bottom plate 62. In the illustrated embodiment, frame 61 is constructed from a conventional 500 um silicon wafer material while bottom plate 62 is constructed of glass. The glass should have a thermal expansion the same as or very similar to silicon. In one embodiment, the glass is Pyrex® 7740 glass. A fluid chamber 3 will be filled with fluid having a comparatively high coefficient of thermal expansion. In one particular embodiment, the fluid will be a performance fluid such as PF-5080 provided by 3M Corporation and have a thermal expansion coefficient of approximately $0.0014°$ $C.^{-1}$ (i.e., percent expansion per degree celcius). Naturally, the present invention is not limited to this expansion coefficient and other embodiments could employ other fluids having expansion coefficients ranging from $0.0002°$ $C.^{-}$ to $0.002°$ $C.^{-1}$ (or even a greater range). Positioned on base plate 62 within fluid cavity 3 are a series of heating elements 63 and temperature sensing elements 64. When it is desired to change the focal length of convex lens portion 5a, heating elements 63 are activated. The heating of the thermally expansive fluid will cause its volume to increase and result in convex lens portion 5a expanding outward to change its curvature and therefore its focal length.

Figure 7:
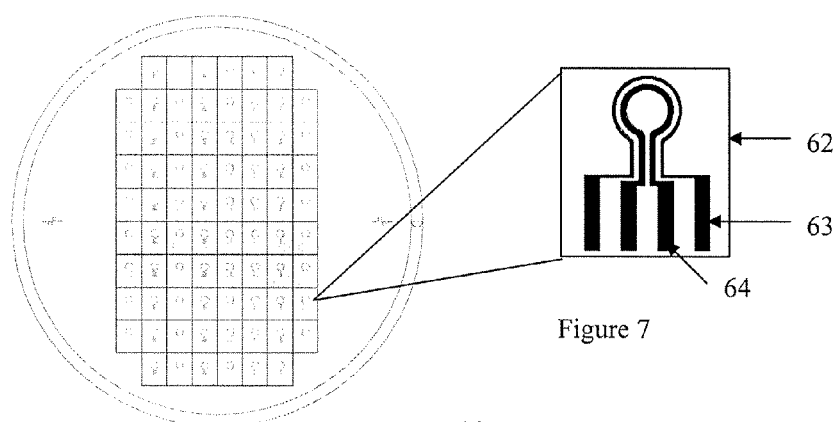
FIG. 7 illustrates one component of the microlens embodiment seen in FIG. 6.
Figure 8A:
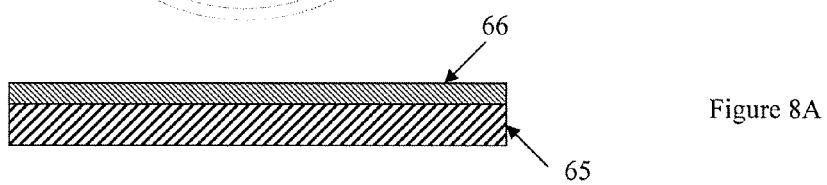
FIGS. 8A to 8D illustrate process steps for fabricating the component seen in FIG. 7.
Figure 8B:
Figure 8C:
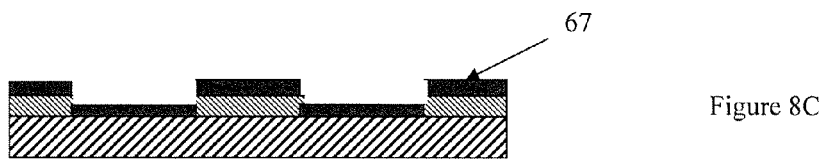
Figure 8D:
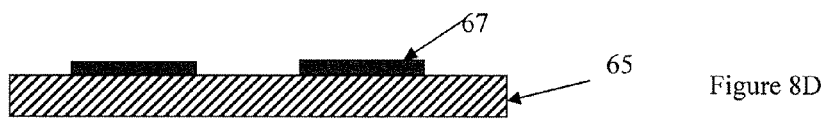

The manufacturing steps of one embodiment of thermally activated lens system 60 are illustrated in FIGS. 7 to 10. FIG. 7 illustrates a glass plate on which is formed a series of smaller bottom plates 62 which will have heating elements 63 and temperature sensing elements 64 formed thereon by a conventional lithography process. As best shown schematically (i.e., not the exact pattern of FIG. 7) in FIGS. 8A to 8D, a glass section 65 is coated with a layer of photoresist 66 approximately 1 um thick. The corresponding patterns for the heating/sensing elements are then transferred to the photoresist by conventional optical lithography and the developed photoresist removed to expose the heating/sensing element patterns on the glass (FIG. 8B). Next, a seed layer of titanium approximately 5 nm thick is sputtered onto the glass and photoresist, followed by a sputtered on platinum layer 67 approximately 0.1 um thick (FIG. 8C). The remaining photoresist and overlaying metal 67 is lifted off (FIG. 8D) to form the final platinum heating/sensor elements 63/64 seen in FIG. 7. The platinum traces also form a good thermal sensing material since the resistance of platinum is linearly proportional to the temperature up to 200° C. with a high degree sensitivity and stability. Thus, the temperature of the expansion fluid can be accurately measured by monitoring the changes in resistance in the platinum of sensor elements 64. The platinum traces also form a good material for heating element 63 since platinum does not tend to oxidize at high temperatures. Further, using platinum for both the heating and sensor elements 63/64 simplifies the fabrication process.

FIGS. 9 and 10 illustrate the fabrication of the other main component of lens system 60, frame 61. As shown schematically in FIG. 9A, a photoresist layer 66 approximately 1 um thick is applied to the first side of a conventional double-side-polished silicon wafer 65 (which already has a thin $SiO_2$ layer formed thereon). The pattern for the fluid chamber is then transferred to the photoresist on the first side by optical lithography and wet etching is used to remove the photoresist in the patterned area (see FIG. 9B). Next, inductively coupled plasma (ICP) deep dry etching is carried out in order to etch the fluid chamber pattern 68 into the silicon frame material.

Then the second side of the wafer 65 is coated with photoresist and patterned with a circular area which will correspond to the through hole over which convex lens portion 5a (FIG. 6) will ultimately be positioned (FIG. 9D). Next, deep dry etching is again used to etch through the wafer 65 into fluid chamber 68, thereby forming through hole 69 (FIG. 9E). Finally, the remaining photoresist is completely removed to provide frame 61 as suggested in FIG. 9F. FIG. 10 provides a more detailed illustration (bottom side of frame) of the etched surfaces in one embodiment of frame 61. It can be seen in this embodiment that fluid chamber 68 extends around the perimeter of through hole 69 and includes a rear accessorial opening 68a (explained below). There is also a fill opening 70 etched on the front edge of wafer 65 to allow access to the fluid chamber after frame 61 and bottom plate 62 are bonded together.

One embodiment of the present invention accomplishes the assembly of frame 61 and bottom plate 62 using conventional anodic bonding. Anodic bonding or field assisted glass-silicon sealing, is a process which permits the sealing of silicon to glass well below the softening point of the glass. The frame 61 and bottom plate 62 are positioned with the fluid chamber 68 facing the heating/sensor elements as suggested in FIG. 11 and the assembled structure heated to a temperature between 400-500 deg. C. A dc power supply is connected to the assembly such that the silicon is positive with respect the glass. When a voltage on the order of a few hundred volts is applied across the assembly, the glass seals to the silicon frame. Accessorial opening 68a is formed in frame 61 so that heating/sensor elements 63/64 would not interfere with the anodic bonding process nor be damaged themselves by the anodic bonding process.

Figure 22:
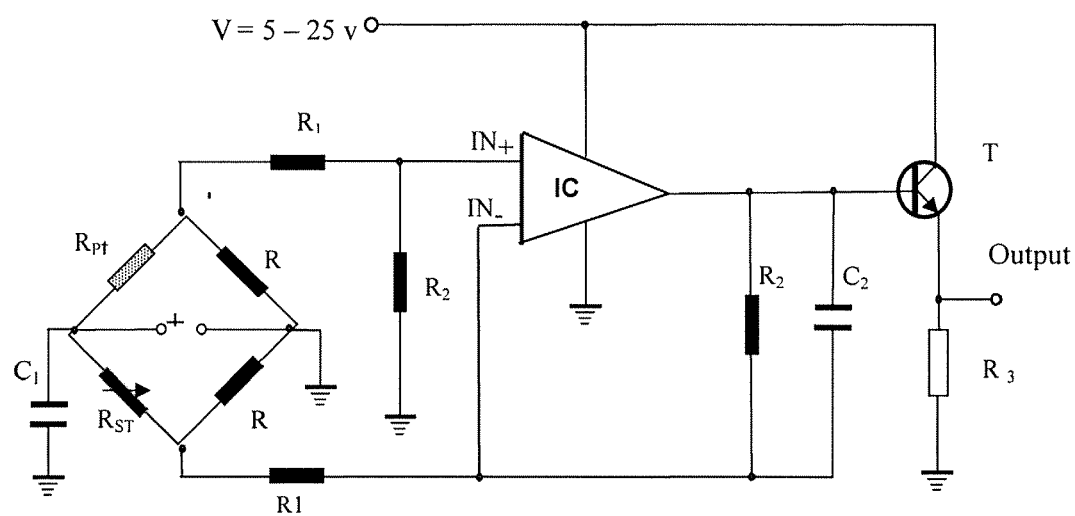
FIG. 22 illustrates a sensor/controller circuit used in the present invention.

Once frame 61 and bottom plate 62 are bonded together, the PDMS lens section 5 will be bonded onto frame 61 using a convention oxygen plasma treatment (explained below). Next, the accessorial opening 68a will be plugged with a small portion of PDMS material and the area covered with epoxy to form a complete seal. The liquid chamber 68 is then filled through the fill hole 70 (FIG. 10) by immersing the frame/bottom plate assembly in a container of thermal expansion fluid. The container is placed under a vacuum for five to ten minutes to assist in removing any air bubbles which may be lingering in liquid chamber 68. The frame/bottom plate assembly is then removed from the liquid and a small block of PDMS of a corresponding size and shape is used to plug fill opening 70 and the area is covered with epoxy to form a complete seal. To prepare lens system 60 for use, it is only necessary to connect heating elements 63 to a power source and temperature sensing elements to temperature sensor/controller circuit. One possible sensor/controller circuit is seen in FIG. 22. $R_{PT}$ acts as the thermal sensor and corresponds with the temperature sensing element 64 in FIG. 7. $R_{ST}$ is the set point (variable resistor) which will be used to set the desired temperature of the fluid. The out put of the sensor/controller circuit will be connected to heating element 63

In certain of the embodiments of the present invention described herein, the PDMS lens section and the silicon based frame may be bonded together using an oxygen plasma treatment. A strong covalent siloxane (Si—O—Si) bond is formed when two plasma oxidized surfaces are brought into contact. The surface activation may be accomplished with a conventional Micro Reactive Ion Etching (Micro-RIE) unit.

The silicon frame and the spin coated PDM lens section (still on the master mold) are loaded into the top chamber of the Micro-RIE unit. After pumping down the chamber to 50 mtorr, the RF power is turned on (320 W), establishing a pale blue plasma. The inlet valve on the chamber is then slowly opened to let in a small stream of oxygen (5.5 sccm), turning the plasma pink. A 30 second exposure to the oxygen plasma (after it has turned pink) consistently yields strong bonds. After 30 seconds, the RF power is turned off, and the chamber is vented, and the samples removed. Within two to three minutes of surface activation, the silicon frame and PDMS lens section must be brought into contact to form a permanent bond between them. The silicon frame and PDMS lens section then only need be left undisturbed for a short period of time (approximately 30 minutes) in order to complete the procedure and form a strong, durable, fluid tight bond between the silicon frame and the PDMS lens section.

Another embodiment of the present invention utilizes the fluid activated lens concept to create a variable focal length microlens system having an increased field of view (FOV). In one embodiment, the increase in the FOV is accomplished through the lens system having the ability to adjustably form a double convex (DCX) lens or a double concave (DCV) lens.

FIGS. 12A and 12B illustrate one embodiment of DCV/DCX lens system 80. Generally, this lens system will comprise a first surface and a second surface formed by upper and lower polymer lens sections 86. Lens sections 86 will be bonded to frame halves 81 and 82 and a through hole in the frame halves will form a view aperture through the two lens sections. A fluid chamber 90 is formed between frame halves 81 and 82 and fluid inlet 84 will allow fluid to flow into or out of fluid chamber 90. A fluid pressurization mechanism (e.g. a micro-pump) will cause an increase or a decrease of fluid pressure in the fluid chamber in order to adjustably form a DCX lens (FIG. 12A) or a DCV lens (FIG. 12B).

Figure 16:
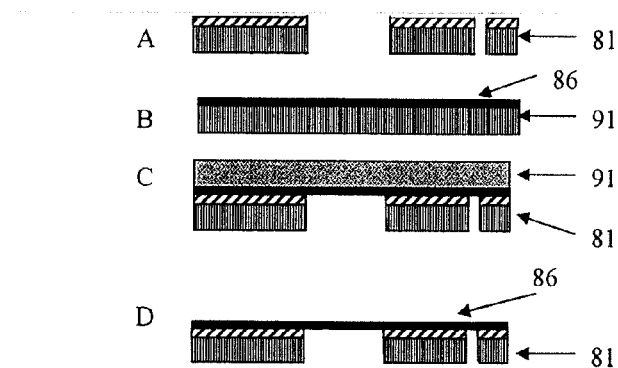
FIGS. 16A to 16D illustrate process steps for adhering a polymer microlens to a lens frame.

One process for fabricating DCV/DCX lens system 80 is seen in FIG. 13. As seen in FIG. 13A, frame section 81 is formed of a silicon wafer material having a thin $SiO_2$ layer. A photoresist layer (such as AZ 4903 photoresist provided by AZ Electric Materials of Somerville, N.J. is formed on the wafer. A pattern is transferred to the photoresist, which in FIG. 13C corresponds to the frame mask 81a seen in FIG. 13J. Using conventional lithography techniques, the photoresist is removed and the underlying pattern is etched out of the wafer material (using for example, inductively coupled plasma etching) to form frame halves 81 and 82 as suggested by FIGS. 13D and 13E. It can be seen that frame halves 81 and 82 will have both through hole 88 and fluid inlet 84. This embodiment of lens system 80 will employ a substantially flat PDMS lens sections 86. FIG. 16A discloses a frame half 81 with an $SiO_2$ layer remaining on the unetched surfaces. As suggested in FIG. 16B, the PDMS lens sections 86 may be formed by spin coating an approximately 100 um thick layer of PDMS on a suitable substrate such as the silicon wafer 91. Naturally, the thickness of the PDMS layer could vary with one example thickness range being about 30 to 200 um. It will be understood that wafer 91 is a completely separate substrate from frame half 81. In one embodiment, prior to the PDMS layer being spun coated onto the wafer, the wafer is placed in tri-chloroSilane vapor rich container in order to form a thin film of tri-chloroSilane on the wafer 91. The tri-chloroSilane will assist in releasing the PDMS layer from the wafer. Thereafter, both the PDMS coated wafer and the completely etched frame half 81 are subject to the oxygen plasma process described above. Silicon wafer 91 is inverted and the surface activated PDMS layer (lens section) 86 is brought into contact with the surface activated frame half 81. Subsequently, the silicon wafer 91 may be peeled away to leave the PDMS lens section 86 firmly bonded to frame half 81 as suggested in FIG. 16D.

Returning to FIGS. 13G and 13I, it can be seen how a spacer element 83 is formed by the same lithography steps in steps 13A-13E, but now using the mask shape seen in FIG. 13I. FIG. 13I illustrates how the spacer element 83 has both the through hole 88 and the fluid channel 89. FIG. 13H suggests how the frame halves 81 and 82 will be bonded to spacer element 83 in order to form the competed DCV/DCX lens system 80. In the embodiment shown, the frame halves 81 and 82 are bonded to spacer element 83 with a conventional epoxy.

As seen in FIG. 12A, if the DCV/DCX lens system 80 is intended to operate as a single pair of frame halves, the fluid outlet 85 will be sealed. When fluid inlet 84 is connected to a micro-pump, fluid pressure may be increased to expand PDMS lens section 86 and form convex lens configuration 87a. Likewise, FIG. 12B illustrates how fluid pressure may be reduced in order to form the concave lens configuration 87b.

Figure 14A:
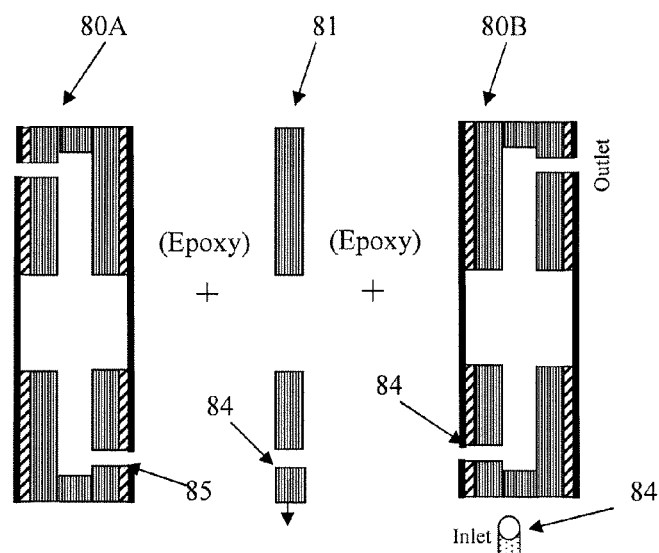
FIGS. 14A and 14B illustrate another embodiment of the DCX/DCV microlens system of the present invention.
Figure 14B:
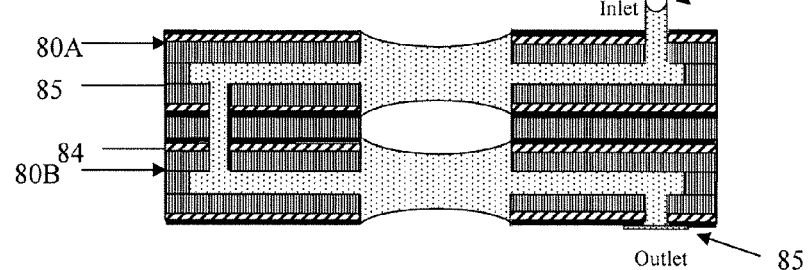

One manner of increasing the FOV in a lens system is to utilize multiple DCV or DCX lenses in series. Therefore, in addition to the single pair of frame halves shown in FIGS. 12A and 12B, the DCV/DCX lens system 80 can include a plurality of paired frame halves to form a multiple DCV/DCX lens system such as seen in FIG. 14B. FIG. 14A suggests how two sets of DCV/DCX lens systems 80A and 80B will be bonded together (for example with epoxy) with a single frame half 81 acting as a spacer member. It can be seen that the fluid outlet 85 of the first DCV/DCX lens system 80 is not obstructed and is positioned to engage the fluid inlet 84 of frame half (now spacer member) 81 and communicate with the inlet 84 of the second DCV/DCX lens system. As seen in FIG. 14B, a continuous fluid path is formed from fluid inlet 84 on lens system 80A, through fluid outlet 85 on lens system 80A, and into lens system 80B through its fluid inlet 84. The fluid outlet 85 on lens system 80B has be blocked as the terminus of the fluid path.

Figure 15:
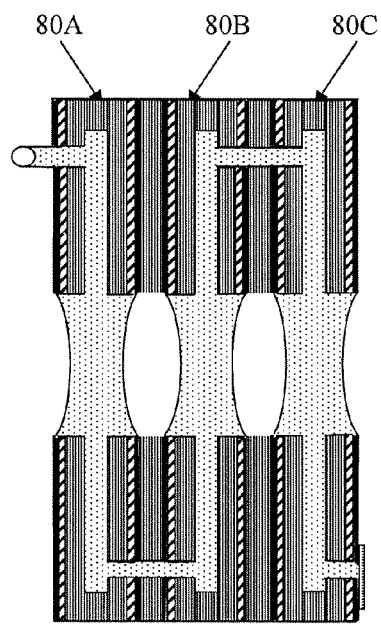
FIG. 15 illustrates a still further embodiment of the DCX/DCV microlens system of the present invention.

FIG. 15 shows a still further embodiment where three lens systems 80A, 80B, and 80C are bonded together (again with frame halves 81 acting as a spacer members) to form a triple DCV lens system. Although FIGS. 14 and 15 show multiple DCV lens systems which tend to give the widest FOV, the present invention also includes multiple DCX systems. In such DCX systems, it may be necessary to include additional spacer members to provide sufficient room for the PDMS lens films to bulge outward in the convex shape.

Another embodiment of the present invention utilizes electroactive polymer (EAP) materials as the actuator of a variable focal length lens system rather than using fluid as described in the above embodiments. One class of EAP actuators are dielectric elastomer actuators. If a polymer film is relatively soft (i.e., has a relatively low modulus of elasticity), then large motions can be produced simply from Maxwell stress. When a voltage is applied across the polymer film, unlike charges on the opposing electrodes will attract each other and tend to squeeze the film and decrease its thickness while like charges on each electrode will tend to repel each other and increase the film thickness. The stress induced in the film is equal to the permittivity of the film multiplied by the square of the applied electric field.

Figure 17A:
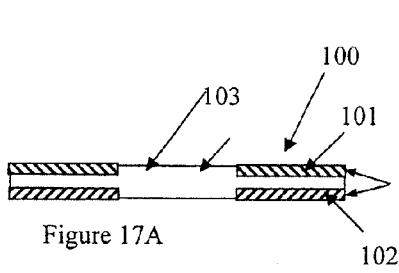
FIGS. 17A and 17B illustrate one embodiment of an EAP actuator of the present invention.
Figure 17B:
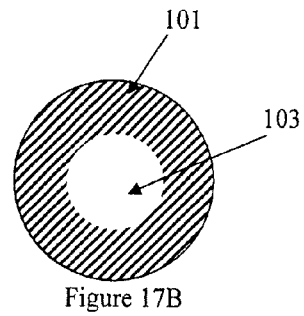

One embodiment of the present invention is illustrated with the circular diaphragm actuator shown in FIGS. 17A and 17B. The actuator 100 is made of transparent PDMS layer 103, the center of which will form a lens area and will not block the light rays transmitted through the lens. PDMS is a good dielectric material having good elasticity and actuation performance. Compliant, circular (ring-shaped as implied in FIG. 17B) electrodes 101 and 102 will be fabricated on each side of the PDMS film. As illustrated below, the outside edge of the thin film layer 103 will be fixed tightly to prevent any movement. Thereafter applying the voltage across the electrodes will cause thin film layer 103 to deform.

Figure 18:
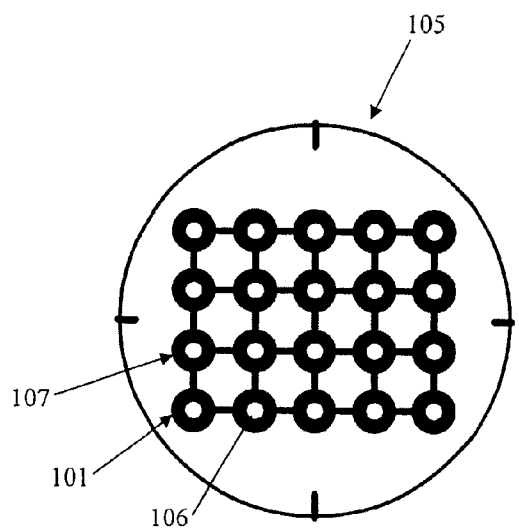
FIG. 18 illustrates a photoresist pattern of an array of EAP actuator components formed on a substrate.
Figure 19:
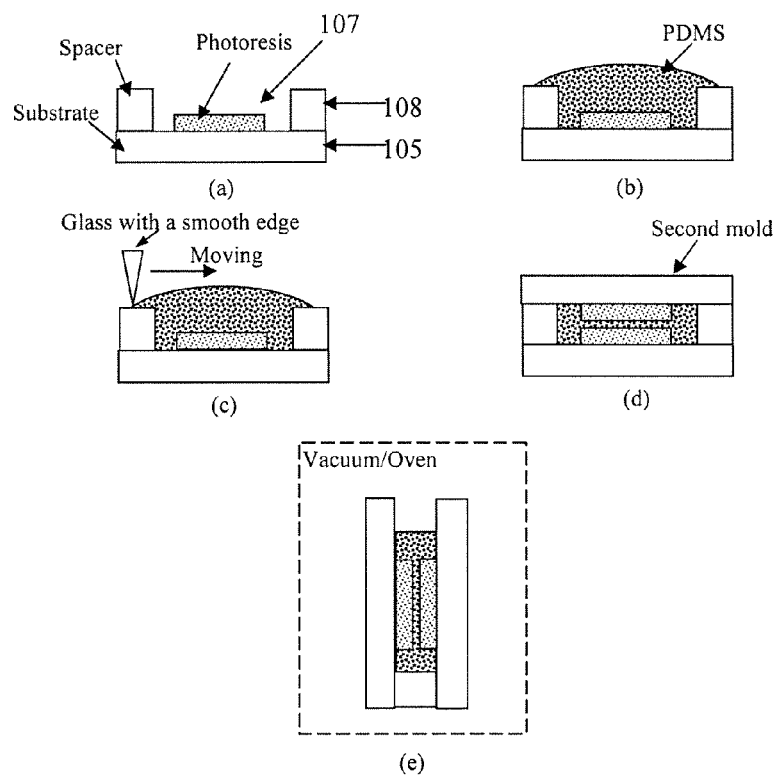
FIGS. 19A to 19E illustrate process steps for forming the EAP actuator embodiment seen in FIG. 17.
Figure 20:
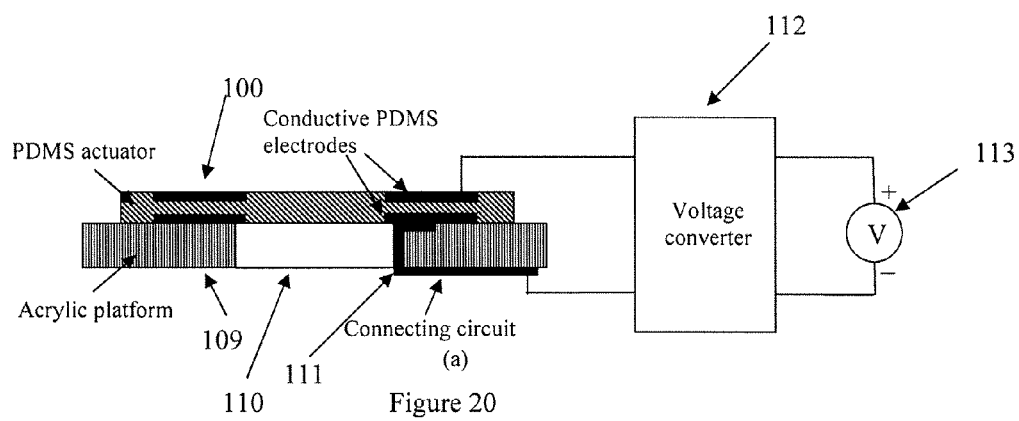
FIG. 20 illustrates an EAP actuator of the present invention.

FIGS. 18-20 illustrate how one embodiment of EAP actuator 100 may be fabricated. FIG. 18 illustrates a circular actuator array designed on a 4-inch diameter substrate 105. A mold patterned in the array of FIG. 18 may be constructed from a convention photoresist for high-aspect-ratio structures. Two suitable photoresists may be obtained from MicroChem Inc. of Newton, Mass. under the tradenames SU8-5 and SU8-10. The photoresist will be formed on a substrate such as Pyrex® glass or a thin copper sheet. Glass is advantageous as a substrate because it is transparent and allows for easier alignment of substrates in the final assembly process (discussed below). A copper substrate is advantageous because it has good flexibility and allows for easy release of the PDMS actuator.

For each electrode unit 101 seen in the array embodiment of FIG. 18, the open center area 106 is 3 mm in diameter while the concentric circular electrodes ring parts 107 are 3 mm in width (i.e., an inner diameter of 3 mm and an outer diameter of 6 mm). FIGS. 19A-19E illustrate how the actuators will be fabricated using a mold-casting process.

FIG. 19A illustrates conceptually how a substrate with a photoresist electrode structure (such as seen in the array of photoresist structures in FIG. 18) is overlayed with a spacer plate 108, thereby providing an enclosed wall around the photoresist structure. In the embodiment shown in FIG. 19A, the spacer walls are approximately 100 to 300 um in height. A PDMS material such as Dow Corning® Sylgard 184 is then poured into the mold as suggested in FIG. 19B. Then a straight edge such as a piece of glass with a very flat smooth edge is used to scrape across the spacer to remove the excess PDMS. Next, a second mold having similar electrode shaped photoresist structures is carefully aligned over the PDMS and lowered onto the spacer as suggested in FIG. 19D. The whole mold/PDMS/mold stack is then clamped and stood vertically with one spacer sidewall removed to allow the free escape of gas bubbles in the uncured PDMS as suggested in FIG. 19E. The stack is left in a vacuum for two hours to help eliminate bubbles. Afterwards the stack is placed in an oven to cure the PDMS at 70° C. for approximately 5 hours. When the cured PDMS layer is pealed off from the substrate, electrode shaped impressions are left in the PDMS material.

These electrode shaped impressions are next filled with a compliant, electrically conducive material to form the electrodes. In the embodiment shown, the material for the compliant electrodes is an electrically conductive PDMS provided by GE® under the tradename Baysilone® LSR 2345/06. The conductive PDMS is brushed into the electrode impressions on both sides of the PDMS film and then the film is placed in the oven or on a hot plate at 70° C. to cure the conductive PDMS. In place of metal leads, the conductive PDMS is also used to form the connection with the outside circuit for testing and/or operation. Because of its flexibility and conductivity, conductive PDMS can be easily used to form connecting circuits by brushing it onto a dielectric platform without affecting the performance of the PDMS actuator. If the PDMS film is in a 4×4 array of single units with connections to each other (such as seen in FIG. 18), this pattern can be easily sectioned into individual units or smaller arrays for fabrication and testing of completed actuator assemblies. In one embodiment, the actuators may range in thickness from 60 µm to 130 µm.

FIG. 20 illustrates one embodiment of the EAP actuator contemplated by the present invention. An individual PDMS actuator 100 is glued on a dielectric (e.g., acrylic) platform 109 with a through hole 110 drilled in its center. The center of the actuator (whose transparency is not obstructed by the electrodes) is centered on the hole 110. The bottom connecting lead 111 is prepared by brushing the conductive PDMS onto the platform before fixing the actuator thereto. The connecting circuit includes a miniature DC to HV DC converter 112 such as a model EMCO® G50 from EMCO High Voltage Corporation, which can realize up to +/−6000V output voltage with a very small output current (<0.25 mA) and a voltage source 113.

FIG. 21A illustrates an embodiment of the present invention utilizing a polymer convex lens in conjunction with EAP actuation. EAP actuated microlens system 120 will include a polymer lens section 5 which will have a convex lens portion 5a and may be formed of a PDMS material as described in above embodiments. Frame 123 may be of any convention material such as silicon wafer material or the acrylic material seen in FIG. 20. Likewise, lens section 5 may be bonded to frame 123 in any conventional manner including epoxy or oxygen plasma bonding where frame 123 is silicon. Compliant, circular (ring-shaped) electrodes 121 and 122 will be fabricated on each side of the polymer lens section 5 around the perimeter of convex lens portion 5a such that electrodes 121 or 122 do not obstruct the line of sight through convex lens portion 5a. Electrodes 121 and 122 may be the conductive PDMS discussed above which is brushed on or electrodes 121 and 122 or could be another compliant conductive material applied in any conventional manner. In the embodiment shown, bottom electrode 122 is somewhat wider than top electrode 121 and extends closer toward the edge of convex lens portion 5a than does top electrode 121.

Figure 21B:
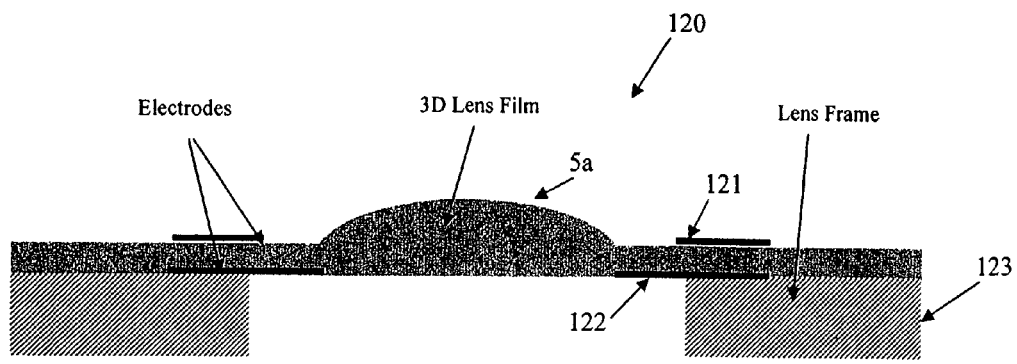
Figure 21B:
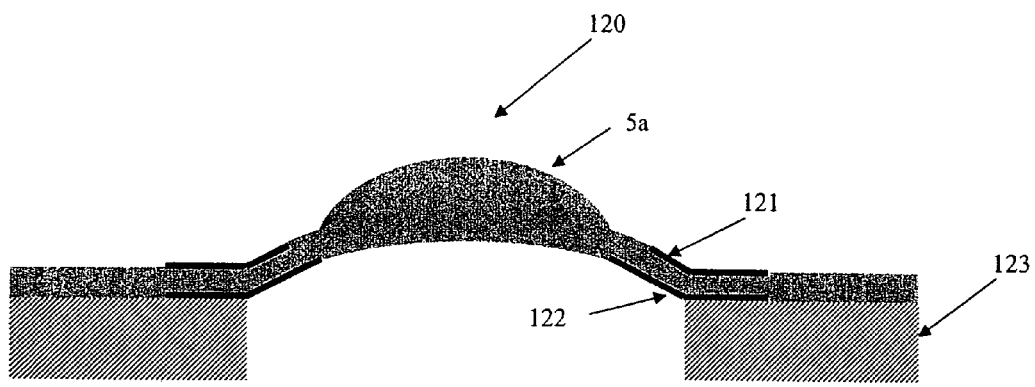

The operation of EAP actuated microlens system 120 can be illustrated in conjunction with FIG. 21B. When voltage is applied across electrodes 121 and 122, the compliant electrodes will have a tendency to squeeze polymer lens section 5. However, because bottom electrode 122 extends to closer to convex lens portion 5a than top electrode 121, it can be understood how bottom electrode 122 pushes upward on the outer edge of convex lens portion 5a more than top electrode can push downward. This net upward force will cause convex lens portion 5a to flex or "bulge" upward in the same manner as described with regards to the earlier embodiments of the fluid actuated lens systems. Since the amount of voltage applied across the electrodes will control the degree to which convex lens portion flexes upward, the focal length of microlens system 120 may be controlled by the amount of voltage applied.

In another embodiment of the present invention, the EAP actuator could be combined with a gradient refractive-index (GRIN) lens. This is accomplished by formulating the PDMS of the EAP actuator as a GRIN material. A GRIN material is an optical medium with a parabolic refractive distribution. For example, in a converging GRIN lens, the refractive index is highest on the circular lens' axis and decreases toward the periphery with the square of the radial distance from the optical axis. The area of PDMS/GRIN material enclosed by the electrodes forms an adjustable GRIN lens. By applying voltage across the electrodes to thin or thicken the PDMS/GRIN material, the focal length of the lens may be adjusted.

For a GRIN lens, the refractive index at any distance r from the optical axis is given by $$n(r) = n_0\left(1 - A \cdot \frac{r^2}{2}\right) \quad (4)$$

where n(r) is the refractive index at any distance r, $n_0$ is the refractive index of the optical axis, A is the positive gradient constant, and r is the radial distance from the optical axis.

Several methods are know in the art for preparing GRIN polymeric optical lens such as two-step copolymerization [8,9], the extrusion method [10], interfacial-gel copolymerization [11], and photopolymerization [12]. In the two-step copolymerization method, a lower-refractive-index monomer diffuses into a crosslinking matrix to form a GRIN distribution.

While the GRIN plastics and their fabrication methods have been studied, a flexible GRIN lens has not been developed. Most GRIN plastic provides only a rigid plastic lens structure and a rigid lens structures cannot provide the change of the focal length. Therefore, the present invention provides a flexible and dielectric polymeric lens.

Silicone-base polymers provide many special characteristics which can meet both the optical and mechanical requirements of the present invention. A silicone-based lens is elastic and deformable under stresses. Moreover, a silicone-base polymer, such as polydimethyl-siloxane (PDMS), is a dielectric material which can be integrated with the EAP actuation system. A flexible GRIN silicone lens comprises a cross-linked silicone polymer matrix, a homogeneously embedded photosensitive macromer, and a photoinitiator. The polymer matrix forms the basic optical element framework and is generally responsible for many of its material, mechanical, and optical properties. The macromer is a low-molecular-weight polymer linked to a photo sensitive group. The photo-initiator is an organic molecule that undergoes dissociation into reactive radicals that begin the polymerization process on exposure to a specific wavelength of light.

After the polymer matrix is formed, the refractive power of the lens may be selectively adjusted by exposing the lens to an ultraviolet (UV) light. On UV irradiation, polymerization of the photosensitive polymer occurs. The application of ultraviolet light to a portion of the lens optic results in disassociation of the photoinitiator to form reactive radicals that initiate polymerization of the photosensitive macromers within the irradiated region of the silicone matrix. Polymerization itself does not result in changes in lens power; it does, however, create a concentration gradient within the lens resulting in the migration of non-irradiated macromers into the region now devoid of macromer as a result of polymerization. The resulting chemical potential causes migration of unpolymerized macromers and photo initiators down a diffusion gradient into the irradiated area of the lens to form a gradient-index distribution. Once the desired power change is achieved, irradiation of the entire lens to polymerize all remaining macromers "locks in" the adjustment so that no further power changes can occur.

The polymeric GRIN lens comprises a photosensitive macromer dispersed in a polymer matrix. The polymer matrix forms the optical element framework. The photosensitive macromer may be a single compound or a combination of compounds that is capable of photo-polymerization. As a general rule, the polymer matrix and the photosensitive macromer are selected such that the components that comprise the photosensitive macromer are capable of diffusion within the polymer matrix. Thus, a loose polymer matrix will tend to be paired with larger photosensitive macromer components, and a tight polymer matrix will tend to be paired with smaller macromer components.

Upon exposure to an appropriate UV light, the photosensitive macromer typically forms a second polymer matrix in the exposed region of the optical element. The presence of the second polymer matrix changes the material characteristics of this portion of the optical element to modulate its refraction capabilities. In general, the formation of the second polymer matrix changes the refractive index of the affected portion of the optical element. After exposure, the photosensitive macromer in the unexposed region will migrate into the exposed region over time. The amount of photosensitive macromer migration into the exposed region is time dependent and may be precisely controlled by diffusion time. If enough diffusion time is permitted, the photosensitive macromer components will re-equilibrate and redistribute the refractive index profile throughout optical element of the first polymer matrix, including the exposed region. When the region is re-exposed to the energy source, the photosensitive macromer that has since migrated into the region, which may be less than if the photosensitive macromer is allowed to re-equilibrate, polymerizes to further increase the formation of the second polymer matrix. After the diffusion step is finished, the entire optical element is exposed to the UV-light to "lock in" the desired lens property by polymerizing the remaining photosensitive macromer components that are outside the exposed region before the components can migrate into the exposed region. Because freely diffusable photosensitive macromer components are no longer available, subsequent exposure of the optical element to UV light cannot further change its power.

There are two different combinations for diverging and converging GRIN lenses. By selecting the proper silicones for matrix and macromer, diverging and converging GRIN lens can be fabricated. If the matrix has a lower refractive index than macromer, the higher refractive index macromer can diffuse into the lens from periphery toward the lens center. The refractive distribution is a parabolic profile in which the refractive index is highest on the lens periphery and decreases toward the center with the square of the radial distance from the optical axis. This refractive distribution induces a diverging GRIN lens. On the other hand, if the macromer's refractive index is lower than the matrix's, the refractive distribution can be changed to the higher refractive index on the lens axis, and it decreases toward the periphery. Thus, this kind of lens is a converging GRIN lens.

EXPERIMENTAL

Example 1

A flexible PDMS lens array was fabricated using the photoresist thermal treatment process described above in reference to FIG. 2. The photoresist material was AZ 100XT because the thickness of a single layer AZ 100XT can reach 50 μm. Two spin-coated photoresist layers are prepared which made the total thickness of the photoresist layer about 100 μm. Cylinders shapes are then formed in the photoresist using convention lithography techniques. These cylinders were thermally treated on a hot plate starting at 75° C. and gradually increasing the temperature. After reaching 120° C., the photoresist cylinders began to melt and reflow to form a spherical structure. The total reflow duration was 60 seconds. SEM images of the reflowed photoresist structures showed well formed 1500 μm diameter photoresist microlens structures which provided a mother mold for the microlens.

Next, the photoresist microstructure was transferred to a PDMS master by the casting method described above. PDMS was chosen as a master material because it provides high dimensional accuracy and easy fabrication. Dow Corning® Sylgard 184 silicone was the particular PDMS used. After the PDMS master was dried in a vacuum oven at 75° C., the mold was peeled away from the mother lens wafer. The PDMS master formed a concave microlens array. SEM images of the master showed well formed concave surfaces with diameters of 1500 μm.

Spin-coat molding was used to fabricate a polymeric microlens by spin coating a PDMS layer on the sacrificial PDMS master. Depending on the spin speed, a thick or thin film with a unique dimension microlens could be obtained. The PDMS film was then cured under vacuum in an oven at 75° C. for 2 hours, and then peeled away from the PDMS master. The topography of the PDMS microlens film as shown in SEM pictures had convex microlens structures with a diameter of 1500 μm and a maximum height in the center of lens of 85 μm.

The mother lens, the PDMS master and final PDMS microlens film were observed by Scanning Electron Microscopy (SEM). In addition, two techniques were used to characterize the surface profiles of the molds and microlens film. The surface profile of the melted photoresist microlens was measured using a Tencor Alpha Step 500 System. The equipment uses a stylus with a ~2 μm chisel head in contact with the sample which confirmed the surface profile of the photoresist mother lens as having a height of 85 μm and a diameter of 1500 μm. An atomic force microscope (AFM, such as a Quesant Instruments scanning probe microscope) was also used to examine the microlens profiles. The AFM provided true 3-D topographic images, which also yielded surface roughness data on the nanometer scale. In the analysis, the AFM was used to measure surface roughness on an area of 10 μm×10 μm of sample surface. The analysis results for AFM 3-D topography of photoresist microlens, PDMS master, and final PDMS lens film are shown in the Table 1. The changes in surface roughness vary during PDMS coating and peel-off processes. Table 1 shows the surface roughness increases from the original reflowed photoresist to the PDMS concave master. However, the surface roughness between the PDMS master and final PDMS microlens film does not significantly change. The roughness for both master mold and final PDMS microlens film was about 17-18.6 nm. This surface roughness is still in an acceptable range for optical requirements.

TABLE 1

Comparison of surface roughness for photoresist microlens, PDMS master and final PDMS microlens

| | Photoresist microlens | PDMS master | Final PDMS microlens |
|---|---|---|---|
| Scanned Area (μm × μm) | 10 × 10 | 10 × 10 | 10 × 10 |
| Average Roughness (nm) | 8.61 nm | 17.2 nm | 18.6 nm |

After obtaining the final PDMS lens film (about 100 μm thick), the film was bonded onto the surface of a silicon wafer, which consists of through holes as chambers for the microfluidic system such as seen in FIG. 1. The chamber was formed by anisotropic dry etching. Inductively Coupled Plasma (ICP) was used to etch through holes in the <100> silicon wafer. The diameter of the chamber was 1500 μm, and the depth was 550 μm. After bonding the PDMS lens onto the silicon wafer, the module with the lens and chamber was sealed to a PDMS block, which contains the microchannel, by using epoxy as glue. The overall dimension of the prototype, as shown in FIG. 1, was about 5 mm×4.5 mm×2.5 mm (L×W×H).

Mechanical properties of the PDMS film were examined by applying a point load in the center of the PDMS film. The corresponding deflections with various loads were measured. Testing showed that there is a linear relationship between applied force and deformation before reaching the maximum mechanical strength of the PDMS film. The maximum force to which the 100 μm thick PDMS film could be loaded before rupturing the film was about 20 g. Within the range of maximum applied force, the film was linearly deformed.

The final assembled optical module with a lens film, a microchamber, and a channel as seen in FIG. 1 was examined in operation. Images captured by a Contact-Angle Measurement System (Data Physics, Future Digital Scientific Corp.) measured the deformation while changing the internal fluid pressure of the chamber. As the fluid volume increased, the contact angle also increased linearly. Each contact angle for a different pumped-in water volume was measured carefully for further lens' optical calculations, such as curvature and back focal length. The lens curvature (R) was obtain using equation 1 listed above. The change of curvature of the lens causes the focal plane shift.

A microlens on microfluidic channel is considered as a plano convex refractive lens assuming that the lens profile is spherical. The curvature of the microlens and back focal length ($f_B$) can be obtained by equation 2 above. The summary of optical properties of the variable focal microlens is shown in Table 2. The range of back focal length was from 3.82 mm to 10.64 mm.

TABLE 2

Summary of optical properties of variable focal microlens

| Photos | | | | | | |
|---|---|---|---|---|---|---|
| Pumped-in volume (μl) | 0.0 | 10.0 | 30.0 | 50.0 | 60 | 70.0 |
| Chamber pressure (psi) | 0.71 | 1.06 | 2.12 | 2.83 | 3.54 | 4.24 |
| Contact angle (°) | 14.8 | 17.5 | 23.4 | 29.5 | 31.6 | 34.1 |
| Curvature (μm) | 3238 | 2538 | 1677 | 1488 | 1312 | 1210 |
| Back Focal Length (μm) | 10640 | 8307 | 5430 | 4751 | 4167 | 3815 |
| Numerical aperture (NA) | 0.09 | 0.11 | 0.17 | 0.19 | 0.22 | 0.24 |

In addition, the numerical aperture can be calculated by equation 3 above. The numerical apertures with various focal lengths were determined and listed in Table 2. The numerical aperture can be tunable between 0.087 and 0.24.

Example 2

A circular diaphragm actuator such as shown in FIG. 17 was designed. The actuator was made of transparent PDMS in order to not block light rays passing through the lens. Compliant, circular electrodes were fabricated on each side of PDMS film. The outside edge of the thin film was fixed tightly to prevent any movement. After applying the voltage on the electrodes, the thin film could be deformed in the central non-electrode part.

A mask for a circular actuator array was designed for a 4-inch substrate as suggested by FIG. 18. For a single actuation unit, the central transparent part was for a fabricated lens that was 3 mm in diameter. The compliant concentric circular electrodes were 3 mm from ID to OD. The actuator array was a 4×4 configuration of single units with connections to each other. After construction of the actuator devices, this pattern could be easily sectioned into small pieces for testing of either single unit actuators or different sized arrays of actuators.

The PDMS actuator was fabricated based on a mold-casting process. The fabrication process is shown in FIG. 19 and combined a molding process with a squeegee-coating process which is described in [7] and realized a double sided patterned actuator structure. The steps to this process included: 1) using photoresist to form an electrode pattern on two 4-inch substrates; 2) placing spacers with the desired thickness on one substrate, a square shape reservoir is formed by using a U-shape spacer and a straight line spacer which is movable in further steps; 3) pouring the PDMS into the mold on the substrate; 4) using a piece of glass with a very flat smooth edge to scrape across the spacer to remove the excess PDMS; 5) aligning and placing the second mold over the PDMS on the spacer and lowering into the PDMS; 6) clamping the whole mold/PDMS/mold stack and standing it vertically after removing one side spacer to prevent spilling uncured PDMS; 7) leaving the stack in vacuum for two hours to eliminate bubbles; and 8) placing the stack in an oven at a sufficient temperature and for a sufficient time to cure the PDMS.

The mold for the actuator was made of SU8 (from MicroChem Inc. of Newton, Mass.), which is a negative photoresist for high-aspect-ratio structures. SU8-5 was chosen for 10 μm structures and SU8-10 for 30 μm structures in the experiments to fabricate different actuator film thicknesses. The fabrication process of the SU8 pattern follows the procedure that is described in the instruction from MicroChem. In order to easily fabricate the PDMS actuator before PDMS casting, two molds of the actuator pattern were made on two different substrates, one was Pyrex® glass; the other was a copper substrate. Because the glass substrate was transparent, it made it easier to align the patterns of the two substrates. The copper substrate had good flexibility, which made it easier to release the PDMS actuator. When patterning onto a copper substrate, pretreatment was important in order to increase the adhesion of SU8. The copper substrate was lapped with very fine sand paper (25 μm) and cleaned with acetone after lapping and before coating with SU8.

The casting PDMS was Dow Corning® Sylgard 184 silicone which has good elasticity and is transparent. After peeling the PDMS film off the substrate, the thickness of the PDMS film was normally a little thicker than the thickness of the spacer because of the challenge of sealing. The material for compliant electrodes was electrically conductive PDMS purchased from GE. When the PDMS actuator structure was ready, the conductive PDMS was brushed into the electrode impressions that were formed in the mold transfer. And then the actuator was placed in an oven or on a hot plate at 70° C. to cure the conductive PDMS. Instead of copper wires, the conductive PDMS was also used to form the connection with the outside circuit for testing.

Because of its flexibility and conductivity, conductive PDMS could be easily used to form connecting circuits by brushing it onto the dielectric platform without affecting the performance of the PDMS actuator. Several PDMS actuators with different thickness ranging from 60 μm to 130 μm are prepared based on the above fabrication process.

After pasting conductive PDMS onto both sides of the PDMS film, the PDMS actuator was glued on a dielectric platform which included a hole drilled therethrough. The center of the actuator was placed in the center of the hole and the connecting circuit (see FIG. 20) is prepared by brushing the conductive PDMS onto the platform before fixing the actuator thereto. The high voltage converter seen in FIG. 20 was a model EMCO® G50 from EMCO High Voltage Corporation. This miniature DC to HV DC converter can realize up to +/−6000V output voltage with very small output current (<0.25 mA). The isolated output was directly proportional to the input, and was linear from approximately 0.7 volts input. During testing, when input voltage was 13 V, the output applied voltage to PDMS actuator was 5500 V.

Deformation tests were conducted by measuring the change of contact angles of the PDMS lens section of the film. When voltage was applied, the PDMS film would deform and the contact angle would change during actuation. The deformation could be calculated based on the contact angle ($\theta$) and the diameter of actuater (d). The curvature (R) could be obtained by:

$$R = \frac{d}{2\sin\theta} \quad (5)$$

The height of deformed structure was $$h = R(1 - \cos\theta) \quad (6)$$

And it could be derived as $$h = \frac{d}{2\sin\theta}(1 - \cos\theta). \quad (7)$$

Based on the above deviation, the deformation of actuated PDMS film could be calculated as $D = h - h_0$, where $h_0$ was the initial height when the PDMS film was in a relaxed condition. Several PDMS actuators with different thicknesses and different diameters of actuated sizes were tested. Table 3 summarizes the deformation of the PDMS actuator with an average 120 μm thickness and 4.7 mm in diameter.

TABLE 3

Summary of deformation of the PDMS actuator

| Pictures | | | | | | |
|---|---|---|---|---|---|---|
| Voltage (V) | 0 | 3.5 | 7.5 | 11.5 | 13.5 | 14.5 |
| Contact angle (°) | 5 | 5.6 | 6.8 | 14 | 14.9 | |
| Same thickness (mm) | | | 0.0103 | 0.0349 | 0.1299 | 0.1839 | 0.2026 |

Two samples with two different opening diameters and same thickness were tested. The results indicated that with a larger diameter, the PDMS actuator could obtain more deformation and a higher starting voltage. Once the PDMS actuator starts to deform, the deformation is proportional to the applied DC voltage. Tests also showed that for the same thickness film, the linear relationship was same even if the opening diameters were different. See Table 4. The only difference was that the film with the larger diameter could have greater deformation.

TABLE 4

Deformation of the PDMS thin film

| Diameter (mm) | Thickness (μm) | Voltage (V) | Contact Angle (°) | Deformation (mm) |
|---|---|---|---|---|
| 9.525 | 70 | 0 | 8 | 0 |
| | | 1.5 | 8 | 0 |
| | | 3.5 | 8.8 | 0.0334 |
| | | 5.5 | 10 | 0.0836 |
| | | 7.5 | 15.4 | 0.3109 |

Example 3

Materials comprising various amount of (a) poly-dimethylsiloxane (PDMS) (Vinyl-addition silicone) as matrix, (b) Methacryloxypropyl Terminated PolyDimethylsiloxanes as photo-sensitive macromer, (c) a UV photoinitiator, 2-Hydroxy-2-methyl-1-phenyl-1-propanone (Ciba Darocur 1173), (d) a crosslinker (Gelest HMS-301), and (e) a Pt initiator for Vinyl-addition silicone cure (SIP6830.3), were made and tested. The first four components (a, b, c & d) were blended together initially. PDMS with the crosslinker HMS-301 was polymerized by addition of platinum catalyst as an initiator. PDMS was the polymeric matrix while the macromer and Darocur 1173 together formed the photo-sensitive macromer composition. Table 5 shows the samples' preparation and testing.

TABLE 5

Material composition for making GRIN lenses

| | Diverging GRIN Lens | | Converging GRIN Lens | | | Photoinitiator | Initiator | |
|---|---|---|---|---|---|---|---|---|
| Test No. | Matrix PDV-0325 (wt %) RI:1.420 | Macromer SIB 1402.0 (wt %) RI:1.450 | Matrix PDV-1625 (wt %) RI:1.465 | Macromer SIB 1400.0 (wt %) RI:1.432 | Crosslinker HMS-301 (wt %) Respect to Matrix | Darocur 1173 (wt %) Respect to Macromer | Platinum Catalyst (wt %) Respect to macromer | Results |
| 1 | 90 | 10 | — | — | 10 | 1.5 | 0.15 | No Diffusion |
| 2 | 80 | 20 | — | — | 10 | 1.5 | 0.15 | No Diffusion |
| 3 | 70 | 30 | — | — | 10 | 1.5 | 0.15 | Good Diffusion |
| 4 | 60 | 40 | — | — | 10 | 1.5 | 0.15 | Good Diffusion |

TABLE 5-continued

Material composition for making GRIN lenses

| | Diverging GRIN Lens | | Converging GRIN Lens | | | Photoinitiator | Initiator | |
|---|---|---|---|---|---|---|---|---|
| Test No. | Matrix PDV-0325 (wt %) RI:1.420 | Macromer SIB 1402.0 (wt %) RI:1.450 | Matrix PDV-1625 (wt %) RI:1.465 | Macromer SIB 1400.0 (wt %) RI:1.432 | Crosslinker HMS-301 (wt %) Respect to Matrix | Darocur 1173 (wt %) Respect to Macromer | Platinum Catalyst (wt %) Respect to macromer | Results |
| 5 | — | — | 90 | 10 | 10 | 1.5 | 0.15 | No Diffusion |
| 6 | — | — | 80 | 20 | 10 | 1.5 | 0.15 | Little Diffusion |
| 7 | — | — | 70 | 30 | 10 | 1.5 | 0.15 | Good Diffusion |
| 8 | — | — | 60 | 40 | 10 | 1.5 | 0.15 | Good Diffusion |

Appropriate amounts of matrix, macromer, Darocur 1173, and HMS-301 were weighed together in a plastic pan, then manually stirred at room temperature until all materials were well-mixed. These initial mixtures were stirred mechanically for 20 minutes before a platinum catalyst was added. Then 0.15% of platinum catalyst with respect to the matrix was added into this mixture, and stirred manually. During stirring of the mixture, many bubbles were generated due to the platinum catalyzed reaction. The mixture was not disturbed and allowed to rest at room temperature for 5 minutes. All bubbles moved toward the surface of the mixture surface, and disappeared when they reached the surface. Due to the fast curing rate of this polymerization process, the reaction was about 10 minutes after a platinum catalyst was added into the mixture. The material handling was very critical after platinum catalyst has been added. The resulting silicone composition was poured into a mold which was made by transparent poly(methyl methacrylate) (PMMA). The mold was a small flat square sample holder. The base area was 105×105 mm$^2$ and the depth was 1.4 mm.

The amount of photo initiator (1.5 wt. %) was based on the data provided from the company (Ciba Specialty Corporation). Darocur 1173 is a versatile highly efficient liquid photoinitiator, used to initiate the photopolymerisation of chemically prepolymers. Darocur 1173 is 2-Hydroxy-2-methyl-1-phenyl-propan-1-one. Its chemical structure has a molecular weight of 164.2 g/mol.

According to the data analysis of absorption spectrum from Ciba, 1.5 wt. % of Darocur 1173 is the suggested addition to the samples to initiate the polymerization chain reaction for a better polymer. The cure time for the first matrix to be formed took about 30 minutes after the platinum (Pt) catalyst was added. The matrix with unpolymerized macromer composition in the mold was moisture cured and stored in the dark at room temperature for a period of 30 minutes to ensure that the resulting first matrix was non-sticky, clear, and transparent.

Although the present invention has been described in terms of certain specific embodiments shown above, such embodiments should only be considered illustrative and there are many other variations and modifications which will come within the scope of the present invention. For example, the present invention includes a method of producing a polymer microlens apparatus comprising the steps of: a) using a lithography process to form a lens base of a thermally reflowable first material; b) heating said reflowable first material to formed a convex mother lens; c) transferring the shape of said mother lens to a mold master of a second material; d.) coating a substantially transparent polymer lens material onto said mold master; and e) releasing said transparent polymer lens material from said mold master. This method also includes the polymer lens material being a PMDS material or wherein a reflowable material is photo-resist. This method includes the step of coating the lens material being a spin coating process and the second material of the master mold being a PDMS material.

The invention also includes a variable focal length microlens apparatus having: a) a lens frame comprising a first surface and a second surface, with a view aperture formed through the first and second surfaces; b) a fluid chamber formed between the first and second surface; c) a flexible, substantially transparent polymer lens section positioned over the view aperture on each of the first and second surfaces; and d) a fluid pressurization mechanism capable of causing an increase or a decrease of fluid pressure in the fluid chamber, thereby adjustably forming a DCV lens or a DCX lens. This embodiment includes the fluid pressurization mechanism comprising a fluid channel connecting the fluid chamber to an exterior of the lens frame. This embodiment includes the fluid channel being connected to a fluid pump exterior to the lens frame or an embodiment wherein multiple lens frames are positioned adjacent to one another in order to form a series of DCV and/or DCX lens. This embodiment further includes a variable focal length microlens wherein the lens frames are interconnected by a common fluid transfer path.

The invention includes a variable focal length microlens apparatus comprising: a) an electrode active polymer section with a lens formed thereon; b) a flexible electrode substantially surrounding an area of the electro active polymer section on which said lens is formed; and c) a power source for supplying electricity to said electrode. This embodiment includes the flexible electrode being ring shaped; or alternatively the electrode active polymer section being substantially planar with a first flexible electrode on a first side of the section and a second electrode on a second side of the section; or alternatively the lens being a GRIN type lens; or alternatively the lens being formed of a flexible polymer and having a convex surface when in an unstrained state.

All such variations and modifications are intended to come within the scope of the following claims.

REFERENCES

All of the following references are incorporated by reference herein in their entirety.

[1] T. Kaneko, T. Ohmi, N. Ohya, N. Kawahara, T. Hattori, A new, compact and quick-response dynamic focusing lens, Proc. 9th Int. Conf. Solid Sate Sensors and Actuators, Transducers '97, pp. 63-66

[2] M. Sato, F. Shimokawa, M. Makihara, Y. Nishida, Two types of thermo-capillary optical switches, Tech. Digest MOEMS97 238-242

[3] L. G. Commander, S. E. Day, C. H. Chia and D. R. Selviah: Microlenses immersed in nematic liquid crystal with ectrically controllable focal length. EOS Topical Digest Meetings Microlens Arrays Vol. 5 (1995) pp. 72-76

[4] Susumu Sato: Application of liquid crystals to variable-focusing lenses. Optical Review Vol. 6, No. 6 (1999) 71-485.

[5] Sunghoon Kwon, Luke P. Lee: Focal length by micro-fabricated planar electrodes-based liquid lens (SPELL). The 11th International Conference on Solid-State Sensors and Actuators, Munich, Germany.

[6] B. Berge, J. Peseux: Variable focal lens controlled by an external voltage: An application of electrowetting. Eur. Phys. J. E, Vol. 3, 159-163, 2000.

[7] Weisong Wang, Zhongmei Yao, Jackie Chen and Ji Fang, "Composite elastic magnetic film with hard magnetic feature", Journal of Micromechanics and Microengineering, Vol 14, p. 1321-1327, 2004.

[8] Y. Ohtsuka and Y. Terao, J. Appl. Polym. Sci., 26, 2907 (1981)

[9] Y. Ohtsuka and T. Sugaho, Appl. Opt., 22, 413, 1983

[10] B. C. Ho, J. H. Chen, W. C. Chen, and Y. H. Chang, Polym. J., 27, 310, 1995

[11] Y. Koike, Y. Kimoto, and Y. Ohtsuka, Appl. Opt., 21, 1057, 1982

[12] J. H. Liu and M. H. Chu, Angew. Makromol. Chem., 174, 1, 1989

We claim:

1. A variable focal length microlens apparatus comprising:
   a. a base section having a fluid chamber and a fluid pressurization mechanism; and
   b. a flexible, substantially transparent polymer lens section fixed above said fluid chamber, said lens section having a curvature providing an initial focal point when in an unstrained state; and
   c. wherein said apparatus has a focal length range which can vary between about 1.5 mm and about 16 mm.

2. The variable focal length microlens apparatus of claim 1, wherein said lens section has a contact angle of at least ten degrees in an unstrained state.

3. The variable focal length microlens apparatus of claim 1, wherein said base section is formed of a polymer and said base section and lens section are joined to a silicon intermediate substrate.

4. The variable focal length microlens apparatus of claim 3, wherein said lens section is formed substantially of a PDMS material.

5. The variable focal length microlens apparatus of claim 1, wherein said lens section comprises a convex lens surface and said convex lens surface has a base diameter of between about 100 um and about 3000 um.

6. The variable focal length microlens apparatus of claim 5, wherein said convex lens surface has a height of between about 15 um and about 200 um in said unstrained state.

7. The variable focal length microlens apparatus of claim 1, wherein said fluid pressurization mechanism comprises a fluid channel connecting said fluid chamber to an exterior of said base section.

8. The variable focal length microlens apparatus of claim 7, wherein said fluid channel is connected to a fluid pump exterior to said base section.

9. The variable focal length microlens apparatus of claim 1, wherein said fluid chamber is substantially sealed and said fluid pressurization mechanism comprises said base section having a flexible wall.

10. The variable focal length microlens apparatus of claim 9, wherein said flexible wall is displaced by a magnetic activation mechanism in order to increase the pressure of a fluid within said fluid chamber.

11. The variable focal length microlens apparatus of claim 10, wherein said magnetic activation mechanism comprises said flexible wall having a magnetic material incorporated therein or affixed thereto and said base section includes a magnet for urging displacement of said magnetic material.

12. The variable focal length microlens apparatus of claim 11, wherein said magnet is an electro-magnet.

13. The variable focal length microlens apparatus of claim 9, wherein said flexible wall is displaced by a PZT material acting thereon.

14. The variable focal length microlens apparatus of claim 13, wherein said PZT material is attached to said flexible wall.

15. A variable focal length microlens apparatus comprising:
   a. a base section having a fluid chamber and a fluid pressurization mechanism;
   b. a flexible, substantially transparent polymer lens section fixed above said fluid chamber said lens section having a curvature providing an initial focal point when in an unstrained state;
   c. wherein said fluid chamber is substantially sealed and said fluid pressurization mechanism comprises a thermo-expansive liquid and a heating element positioned in contact with said thermo-expansive liquid; and
   d. wherein a temperature sensor is positioned in contact with said liquid.

16. The variable focal length microlens apparatus of claim 15, wherein said liquid has a thermal expansion coefficient of between about 0.0002 and about $0.002° C.^{-1}$.

17. The variable focal length microlens apparatus of claim 16, wherein said temperature sensor comprises a conductive metal trace applied to a bottom wall of said fluid chamber.

18. The variable focal length microlens apparatus of claim 15, wherein said heating element is a metal strip applied to a bottom wall of said fluid chamber.

19. The variable focal length microlens apparatus of claim 1, wherein said polymer lens section is formed by a method comprising the steps of:
   a. using a lithography process to form a lens base of a thermally reflowable first material;
   b. heating said reflowable first material to form a convex mother lens;
   c. transferring the shape of said mother lens to a mold master of a second material;
   d. coating a substantially transparent polymer lens material onto said mold master; and
   e. releasing said transparent polymer lens material from said mold master.

20. The variable focal length microlens apparatus of claim 15, wherein said apparatus has a focal length range which can vary between about 1.5 mm and about 16 mm.

21. The variable focal length microlens apparatus of claim 20, wherein said lens section comprises a convex lens surface and said convex lens surface has a base diameter of between about 100 um and about 3000 um.

* * * * *